US012750768B2

(12) United States Patent
Yavuz et al.

(10) Patent No.: US 12,750,768 B2
(45) Date of Patent: Sep. 29, 2026

(54) METHODS FOR DEVICES THAT DO NOT SUPPORT NTNS TO AVOID CELL SELECTION/(RE)SELECTION TO A CELL IN NTN

(71) Applicant: Telefonaktiebolaget LM Ericsson (PUBL), Stockholm (SE)

(72) Inventors: Emre Yavuz, Stockholm (SE); Helka-Liina Määttänen, Espoo (FI); Johan Rune, Lidingö (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 415 days.

(21) Appl. No.: 18/261,322

(22) PCT Filed: Jan. 14, 2022

(86) PCT No.: PCT/IB2022/050302
§ 371 (c)(1),
(2) Date: Jul. 13, 2023

(87) PCT Pub. No.: WO2022/153238
PCT Pub. Date: Jul. 21, 2022

(65) Prior Publication Data
US 2024/0080758 A1 Mar. 7, 2024

Related U.S. Application Data

(60) Provisional application No. 63/137,549, filed on Jan. 14, 2021.

(51) Int. Cl.
*H04W 48/18* (2009.01)
*H04W 48/10* (2009.01)
*H04W 84/06* (2009.01)

(52) U.S. Cl.
CPC .......... *H04W 48/18* (2013.01); *H04W 48/10* (2013.01); *H04W 84/06* (2013.01)

(58) Field of Classification Search
CPC ..... H04W 48/18; H04W 48/10; H04W 84/06; H04W 48/12; H04W 48/02; H04B 7/185
See application file for complete search history.

(56) References Cited

U.S. PATENT DOCUMENTS 11,523,441 B2 * 12/2022 Jeon .................. H04W 74/0841
11,716,775 B2 * 8/2023 Luo ....................... H04W 76/28 370/329
2011/0199905 A1 8/2011 Pinheiro et al.

FOREIGN PATENT DOCUMENTS

KR 20200085986 A 7/2020

OTHER PUBLICATIONS

3GPP TSG-RAN WG2 Meeting #111; Electronic, Aug. 17-28, 2020; Agenda item: 8.10.3.1; Source: ZTE Corporation, Sanechips; Title: Offline-106: [NTN] Idle mode issues (R2-2008187).

(Continued)

*Primary Examiner* — Diane D Mizrahi
(74) *Attorney, Agent, or Firm* — Baker Botts L.L.P.

(57) ABSTRACT

According to certain embodiments, a method is performed by a wireless device that does not support non-terrestrial network (NTN) communication. The method comprises receiving, from a network node, information configured to cause wireless devices that do not support NTN communication to avoid cell selection or re-selection to a candidate cell in the NTN. In response to receiving the information, the method comprises avoiding cell selection or re-selection to the candidate cell in the NTN.

13 Claims, 16 Drawing Sheets

(56) References Cited

OTHER PUBLICATIONS

PCT International Search Report issued for International application No. PCT/IB2022/050302—Apr. 8, 2022.
PCT Written Opinion of the International Searching Authority issued for International application No. PCT/IB2022/050302—Apr. 8, 2022.
3GPP TSG-RAN WG2 Meeting#111; Electronic, Aug. 17-28, 2020; Source: ZTE Corporation, Sanechips; Title: Consideration on system information and cell (re)selection in NTN; Agenda item: 8.10.3.1 (R2-2006872).
3GPP TSG RAN meeting #80, La Jolla, USA, Jun. 11-14, 2018; Source: Thales; Title: Study on solutions evaluation for NR to support Non Terrestrial Network; Type: SID new; Document for: Approval; Agenda Item: 9.1.17—Study on solutions evaluation for NR to support Non Terrestrial Network, Moderator: Thales (RP-181370).
3GPP TS 36.304 V16.2.0 (Sep. 2020); 3rd Generation Partnership Project; Technical Specification Group Radio Access Network; Evolved Universal Terrestrial Radio Access (E-UTRA); User Equipment (UE) procedures in idle mode (Release 16).
3GPP TR 38.811 V15.4.0 (Sep. 2020); 3rd Generation Partnership Project; Technical Specification Group Radio Access Network; Study on New Radio (NR) to support non-terrestrial networks (Release 15).
3GPP TR 38.821 V16.0.0 (Dec. 2019); 3rd Generation Partnership Project; Technical Specification Group Radio Access Network; Solutions for NR to support non-terrestrial networks (NTN) (Release 16).
3GPP TS 38.213 V16.3.0 (Sep. 2020); 3rd Generation Partnership Project; Technical Specification Group Radio Access Network; NR; Physical layer procedures for control (Release 16).
3GPP TS 38.212 V16.3.0 (Sep. 2020); 3rd Generation Partnership Project; Technical Specification Group Radio Access Network; NR; Multiplexing and channel coding (Release 16).
3GPP TS 36.331 V16.2.1 (Sep. 2020); 3rd Generation Partnership Project; Technical Specification Group Radio Access Network; Evolved Universal Terrestrial Radio Access (E-UTRA); Radio Resource Control (RRC); Protocol specification (Release 16).
3GPP TS 38.331 V16.2.0 (Sep. 2020); 3rd Generation Partnership Project; Technical Specification Group Radio Access Network; NR; Radio Resource Control (RRC) protocol specification (Release 16).

* cited by examiner

METHODS FOR DEVICES THAT DO NOT SUPPORT NTNS TO AVOID CELL SELECTION/(RE)SELECTION TO A CELL IN NTN

PRIORITY

This nonprovisional application is a U.S. National Stage Filing under 35 U.S.C. § 371 of International Patent Application Serial No. PCT/IB2022/050302 filed Jan. 14, 2022 and entitled "METHODS FOR DEVICES THAT DO NOT SUPPORT NTNS TO AVOID CELL SELECTION/(RE) SELECTION TO A CELL IN NTN" which claims priority to U.S. Provisional Patent Application No. 63/137,549 filed Jan. 14, 2021, both of which are hereby incorporated by reference in their entirety.

TECHNICAL FIELD

Certain embodiments of the present disclosure relate, in general, to wireless communications and, more particularly, to methods for devices that do not support non-terrestrial networks (NTNs) to avoid cell selection/(re)selection to a cell in NTN.

BACKGROUND

In Third Generation Partnership Project (3GPP) Release 8, the Evolved Packet System (EPS) was specified. EPS is based on the Long-Term Evolution (LTE) radio network and the Evolved Packet Core (EPC). It was originally intended to provide voice and mobile broadband (MBB) services but has continuously evolved to broaden its functionality. Since Release 13 Narrowband Internet-of-Things (NB-IoT) and LTE for Machine-Type-Communications (MTC) (LTE-M) are part of the Evolved Universal Terrestrial Radio Access Network (E-UTRAN) (LTE) specifications and provide connectivity to massive machine type communications (mMTC) services.

In 3GPP Release 15, the first release of the Fifth Generation (5G) System (5GS) was specified. This is a new generation's radio access technology intended to serve use cases such as enhanced mobile broadband (eMBB), ultra-reliable and low latency communication (URLLC) and mMTC. 5G includes the New Radio (NR) access stratum interface and the 5G Core Network (5GC). The NR physical and higher layers are reusing parts of the E-UTRAN (LTE) specification, and additional components are introduced when motivated by the new use cases.

3GPP support for Non-Terrestrial Networks

In Release 15, 3GPP also started the work to prepare NR for operation in a Non-Terrestrial Network (NTN). The work was performed within the study item "NR to support Non-Terrestrial Networks" and resulted in [1] Technical Report (TR) 38.811, Study on New Radio (NR) to support non-terrestrial networks. In Release 16 the work to prepare NR for operation in an NTN network continues with the study item "Solutions for NR to support Non-Terrestrial Network." In parallel the interest to adapt E-UTRAN (LTE) for operation in NTN is growing. As a consequence, 3GPP has agreed to introduce support for NTN in NR and study whether/how it would be possible to provide connectivity to massive machine type communication (mMTC) services in Release 17.

Characteristics of a Non-Terrestrial Network

A satellite radio access network usually includes the following components:

- A satellite that refers to a space-borne platform.
- An earth-based gateway that connects the satellite to a base station or a core network, depending on the choice of architecture.
- Feeder link that refers to the link between a gateway and a satellite
- Access link that refers to the link between a satellite and a user equipment (UE).

Depending on the orbit altitude, a satellite may be categorized as low earth orbit (LEO), medium earth orbit (MEO), or geostationary earth orbit (GEO) satellite.

- LEO: typical heights ranging from 250-1,500 km, with orbital periods ranging from 90-120 minutes.
- MEO: typical heights ranging from 5,000-25,000 km, with orbital periods ranging from 3-15 hours.
- GEO: height at about 35,786 km, with an orbital period of 24 hours.

The significant orbit height means that satellite systems are characterized by a path loss that is significantly higher than what is expected in terrestrial networks. To overcome the pathloss it is often required that the access and feeder links are operated in line of sight conditions, and that the UE is equipped with an antenna offering high beam directivity.

A communication satellite typically generates several beams over a given area. The footprint of a beam is usually in an elliptic shape, which has been traditionally considered as a cell. The footprint of a beam is also often referred to as a spotbeam. The spotbeam may move over the earth surface with the satellite movement or may be earth fixed with some beam pointing mechanism used by the satellite to compensate for its motion. The size of a spotbeam depends on the system design, which may range from tens of kilometers to a few thousands of kilometers.

FIG. 1 shows an example architecture of a satellite network with bent pipe transponders. The NTN beam may in comparison to the beams observed in a terrestrial network be very wide and cover an area outside of the area defined by the served cell. Beam covering adjacent cells will overlap and cause significant levels of intercell interference. To overcome the large levels of interference a typical approach is a NTN to configure different cells with different carrier frequencies and polarization modes.

Throughout this disclosure, the terms beam and cell may be used interchangeably, unless explicitly noted otherwise. The disclosure is described with reference to NTN, but the methods proposed apply to any wireless networks or Radio Access Technologies (RATs) that require additional capability with respect to legacy networks/RATs to establish a connection.

Mobility in RRC_IDLE and RRC_INACTIVE

Cell selection is the process performed by a UE for selecting a cell to camp on when the UE does not already camp on a cell. Cell reselection is the corresponding process when the UE is already camping on a cell, i.e. the process of finding a better cell to camp on than the current serving (camping) cell and start camping on that cell instead.

"Camping on a cell" means that the UE is synchronized with the cell's downlink transmissions, ensures that up-to-date system information (that is relevant for UE's operation) for the cell is stored in the UE, monitors the Physical Downlink Control Channel (PDCCH) for paging transmissions and monitors the channel quality to assess the cell's suitability as a serving cell in relation to other cells to potentially camp on (by performing cell reselection). A UE camps on a cell while in Radio Resource Control (RRC) idle (RRC_IDLE) or RRC inactive (RRC_INACTIVE) states. The cell on which UE is camping, is also referred to as UE's serving cell.

Cell selection and cell reselection procedures in NR and E-UTRAN (LTE) are specified quite similarly in 3GPP Technical Specification (TS) 38.304 and 3GPP TS 36.304, respectively.

Cell Selection

The cell selection criterion, S, has central importance in cell selection (and cell reselection) procedure, which is specified as follows in 3GPP TS 38.304:

The cell selection criterion S is fulfilled when:

$$Srxlev>0 \text{ AND } Squal>0$$

where:

$$Srxlev=Q_{rxlevmeas}-(Q_{rxlevmin}+Q_{rxlevminoffset})-P_{compensation}-Qoffset_{temp}$$

$$Squal=Q_{qualmeas}-(Q_{qualmin}+Q_{qualminoffset})-Qoffset_{temp}$$

where:

| | |
|---|---|
| Srxlev | Cell selection receive (RX) level value (dB) |
| Squal | Cell selection quality value (dB) |
| $Qoffset_{temp}$ | Offset temporarily applied to a cell as specified in TS 38.331 [3] (dB) |
| $Q_{rxlevmeas}$ | Measured cell RX level value (Reference Signal Received Power (RSRP)) |
| $Q_{qualmeas}$ | Measured cell quality value (Reference Signal Received Quality (RSRQ)) |
| $Q_{rxlevmin}$ | Minimum required RX level in the cell (dBm). If the UE supports Supplementary Uplink (SUL) frequency for this cell, Qrxlevmin is obtained from q-RxLevMinSUL, if present, in System Information Block (SIB) numbers SIB1, SIB2 and SIB4, additionally, if $Q_{rxlevminoffsetcellSUL}$ is present in SIB3 and SIB4 for the concerned cell, this cell specific offset is added to the corresponding Qrxlevmin to achieve the required minimum RX level in the concerned cell;<br>else Qrxlevmin is obtained from q-RxLevMin in SIB1, SIB2 and SIB4, additionally, if $Q_{rxlevminoffsetcell}$ is present in SIB3 and SIB4 for the concerned cell, this cell specific offset is added to the corresponding Qrxlevmin to achieve the required minimum RX level in the concerned cell. |
| $Q_{qualmin}$ | Minimum required quality level in the cell (dB). Additionally, if $Q_{qualminoffsetcell}$ is signalled for the concerned cell, this cell specific offset is added to achieve the required minimum quality level in the concerned cell. |
| $Q_{rxlevminoffset}$ | Offset to the signalled $Q_{rxlevmin}$ taken into account in the Srxlev evaluation as a result of a periodic search for a higher priority Public Land Mobile Network (PLMN) while camped normally in a Visited PLMN (VPLMN), as specified in TS 23.122 [9]. |
| $Q_{qualminoffset}$ | Offset to the signalled $Q_{qualmin}$ taken into account in the Squal evaluation as a result of a periodic search for a higher priority PLMN while camped normally in a VPLMN, as specified in TS 23.122 [9]. |
| $P_{compensation}$ | For Frequency Range 1 (FR1), if the UE supports the additionalPmax in the NR-NS-PmaxList, if present, in SIB1, SIB2 and SIB4:<br>$\max(P_{EMAX1} - P_{PowerClass}, 0) - (\min(P_{EMAX2}, P_{PowerClass}) - \min(P_{EMAX1}, P_{PowerClass}))$ (dB);<br>else:<br>$\max(P_{EMAX1} - P_{PowerClass}, 0)$ (dB)<br>For FR2, $P_{compensation}$ is set to 0. |
| $P_{EMAX1}$, $P_{EMAX2}$ | Maximum transmit (TX) power level of a UE may use when transmitting on the uplink in the cell (dBm) defined as $P_{EMAX}$ in TS 38.101 [15]. If UE supports SUL frequency for this cell, $P_{EMAX1}$ and $P_{EMAX2}$ are obtained from the p-Max for SUL in SIB1 and NR-NS-PmaxList for SUL respectively in SIB1, SIB2 and SIB4 as specified in TS 38.331 [3], else $P_{EMAX1}$ and $P_{EMAX2}$ are obtained from the p-Max and NR-NS-PmaxList respectively in SIB1, SIB2 and SIB4 for normal UL as specified in TS 38.331 [3]. |
| $P_{PowerClass}$ | Maximum RF output power of the UE (dBm) according to the UE power class as defined in TS 38.101-1 [15]. |

Another central concept in cell selection and reselection procedures is "suitable cell." In short, a suitable cell is a cell that fulfills the cell selection criterion and in which the UE can receive normal service.

FIG. 2 illustrates the states and state transitions for a UE cell selection and cell reselection in RRC_IDLE or RRC_INACTIVE states.

There are two variants of cell selection in NR:

Initial cell selection, where the UE has no prior knowledge of which radio frequency channels are NR frequencies, in which case the UE scans all radio frequency channels in the NR bands according to its capabilities to find a suitable cell to select and camp on.

Cell selection by leveraging stored information, where the UE has stored previously acquired information about frequencies and possibly also cell parameters, which it utilizes to streamline the procedure of selection a suitable cell to camp on.

In 3GPP TS 38.304, these variants are specified as follows: Cell selection is performed by one of the following two procedures:

a) Initial cell selection (no prior knowledge of which RF channels are NR frequencies):
   1. The UE shall scan all RF channels in the NR bands according to its capabilities to find a suitable cell.
   2. On each frequency, the UE need only search for the strongest cell, except for operation with shared spectrum channel access where the UE may search for the next strongest cell(s).
   3. Once a suitable cell is found, this cell shall be selected.

b) Cell selection by leveraging stored information:
   1. This procedure requires stored information of frequencies and optionally also information on cell parameters from previously received measurement control information elements or from previously detected cells.
   2. Once the UE has found a suitable cell, the UE shall select it.
   3. If no suitable cell is found, the initial cell selection procedure in a) shall be started.

NOTE: Priorities between different frequencies or RATs provided to the UE by system information or dedicated signalling are not used in the cell selection process.

Similar variants for cell selection were specified in 3GPP TS 36.304 for E-UTRAN (LTE) as follows:

The UE shall use one of the following two cell selection procedures:

a) Initial Cell Selection: this procedure requires no prior knowledge of which RF channels are E-UTRA or NB-IoT carriers. The UE shall scan all RF channels in the E-UTRA bands according to its capabilities to find a suitable cell. On each carrier frequency, the UE need only search for the strongest cell. Once a suitable cell is found this cell shall be selected.

b) Stored Information Cell Selection: this procedure requires stored information of carrier frequencies and optionally also information on cell parameters, from previously received measurement control information elements or from previously detected cells. Once the UE has found a suitable cell the UE shall select it. If no suitable cell is found the Initial Cell Selection procedure shall be started.

NOTE 1: Priorities between different frequencies or RATs provided to the UE by system information or dedicated signalling are not used in the cell selection process.

NOTE 2: If bandwidth reduced low complexity (BL) UE, UE in enhanced coverage or NB-IoT UE has been provisioned with E-UTRA Absolute Radio Frequency Channel Number (EARFCN), the UE may use this information during Initial Cell Selection and Stored Information Cell Selection to find a suitable cell.

Cell Re-Selection

Cell reselection involves reselection between cells on the same carrier frequency, between cells on different carrier frequencies as well as between different RATs (on different carrier frequencies).

Cell Reselection Between Different Carrier Frequencies and RATs

The network can configure priorities which govern how the UE performs cell reselection between carrier frequencies and RATs. The network can further configure threshold-based conditions which must be fulfilled for inter-frequency/Radio Access Technology (RAT) cell reselection to take place. The carrier frequency and RAT priorities and the thresholds governing inter-frequency and inter-RAT cell reselection can be configured through the broadcast system information and the carrier frequency and RAT priorities can also be configured through dedicated signaling using the RRCRelease/RRCConnectionRelease message.

For cell reselection to a higher priority carrier frequency or RAT, it suffices that the concerned cell's quality exceeds a configured threshold. For cell reselection to a lower priority carrier frequency or RAT, the concerned cell's quality has to exceed a configured threshold and the serving cell's quality has to be below another configured threshold. Cell reselection to a cell on a carrier frequency with equal priority, including the current carrier frequency (i.e. intra-frequency cell reselection) is based on a cell ranking procedure described further below.

Cell reselection to a higher priority RAT/carrier frequency has precedence over a lower priority RAT/frequency, if multiple cells of different priorities fulfil the cell reselection criteria. If multiple cells fulfil the cell reselection criteria on the selected (i.e. highest priority) carrier frequency and this carrier frequency is an NR carrier, the UE reselects to the highest ranked of these cells according to the cell ranking procedure described further below. If multiple cells fulfil the cell reselection criteria on the selected (i.e. highest priority) (non-NR) RAT, the UE reselects to one of these cells in accordance with the criteria that apply for that RAT.

If cells on multiple carrier frequencies and/or RATs fulfill the cell reselection criteria, the UE should reselect to a cell on the carrier frequency or RAT with the highest priority (out of the ones for which there are cells meeting the cell reselection criteria). If multiple cells fulfil the cell reselection criteria on this carrier frequency/RAT, the UE uses the cell ranking procedure described below.

Intra-Frequency Cell Reselection and Inter-Frequency Cell Reselection to Equal Priority Carrier Frequencies When multiple NR cells with equal priority fulfil the cell reselection criteria, including both intra-frequency cells and inter-frequency cells (where the inter-frequency carrier frequencies have a priority that is equal to the priority of the UE's current carrier frequency), the UE uses a cell ranking procedure to identify the best (highest ranked) cell to reselect to.

The cell ranking is performed as follows: For each cell involved in the cell ranking procedure, the UE calculates a ranking value (denoted $R_n$ for a neighbor cell and $R_s$ for the serving cell) according to the following two formulae (one for the serving cell and one for neighbor cells):

$$R_s = Q_{meas,s} + Q_{hyst} - Qoffset_{temp}$$

$$R_n = Q_{meas,n} - Qoffset - Qoffset_{temp}$$

where:

| | |
|---|---|
| $Q_{meas}$ | RSRP measurement quantity used in cell reselections. |
| Qoffset | For intra-frequency: Equals to $Qoffset_{s,n}$, if $Qoffset_{s,n}$ is valid, otherwise this equals to zero. For inter-frequency: Equals to $Qoffset_{s,n}$ plus $Qoffset_{frequency}$, if $Qoffset_{s,n}$ is valid, otherwise this equals to $Qoffset_{frequency}$. |
| $Qoffset_{temp}$ | Offset temporarily applied to a cell as specified in 3GPP TS 38.331. |

To determine a cell's RSRP ($Q_{meas,s}$ for the serving cell, $Q_{meas,n}$ for a neighbor cell) the UE measures the RSRP of each of the cell's SSBs and calculates the linear average of a set of the resulting RSRP values. The set of SSB RSRP values to base the averaging on is determined by two parameters configured in the system information: An RSRP threshold, absThreshSS-BlocksConsolidation, which the RSRP of an SSB must exceed for the SSB's RSRP value to be part of the average calculation, and an integer parameter, nrofSS-BlocksToAverage, representing the maximum number of RSRP values to be used in the averaging. That is, the UE calculates the average (in the linear domain) of the up to nrofSS-BlocksToAverage highest RSRP values exceeding absThreshSS-BlocksConsolidation. If less then nrofSS-BlocksToAverage RSRP values exceed absThreshSS-BlocksConsolidation, the UE calculates the linear average of the RSRP values that exceed absThreshSS-BlocksConsolidation. If no SSB RSRP value exceeds absThreshSS-Blocks-Consolidation, the UE determines the cell RSRP as the RSRP of the SSB with the highest RSRP in the cell.

Both nrofSS-BlocksToAverage and absThreshSS-Blocks-Consolidation are optional to configure. If any of them is absent, the UE determines the cell RSRP as the RSRP of the SSB with the highest RSRP in the cell.

As one option, the UE reselects to (or remains in) the highest ranked cell, i.e. the one with the highest R ($R_n$ or $R_s$) value, according to the above algorithm. That is, if one of the neighbor cells is ranked the highest, the UE reselects to that cell, while if the serving cell gets the highest rank, then the UE remains camping on the current serving cell.

As another option, the network may configure an offset range in relation to the highest calculated R value ($R_n$ or $R_s$), denoted rangeToBestCell. With this option, any non-highest ranked cell whose ranking value, $R_n$ or $R_s$, closer to the highest R value than range ToBestCell, are qualified to a second round, where the UE selects the cell to reselect to (or remain camping on, in case the serving cell is selected) based on the number of SSBs each cell has with RSRP values above absThreshSS-BlocksConsolidation. If two or more of these cells have the same number of SSBs with RSRP above absThreshSS-BlocksConsolidation, the UE selects the cell with the highest R value. If rangeToBestCell is configured, but absThreshSS-BlocksConsolidation is not configured, the UE considers that there is one SSB above the threshold for each cell on that frequency.

In order for any of the above described conditions for cell reselection result in a cell reselection, it must persist for a configurable time period (t-reselectionNR for NR or t-reselectionEUTRA for EUTRA, which respectively correspond to the parameters $Treselection_{NR}$ and $Treselection_{UTRA}$ in 3GPP TS 38.304 and 3GPP TS 36.304), which is configured in the system information. An additional condition is that no preceding cell reselection has occurred during the last 1 second.

If the cell a UE has selected for reselection is found to be not suitable, the UE will not reselect to that cell and its further behavior is specified in section 5.2.4.4 in 3GPP TS 38.304. Similar description is specified also in 3GPP TS 36.304.

Means to Limit Neighbor Cell Measurements and the Frequency of Cell Reselections The standard has several built-in mechanisms for limiting the amount of neighbor cell measurements a UE needs to perform and the frequency of its cell reselections.

To this end, the UE may choose not to perform intra-frequency measurements, if the serving cell fulfils Srxlev>$S_{InuaSearchP}$ and Squal>$S_{IntraSearchQ}$. Similarly, if the serving cell fulfils Srxlev>$S_{nonIntraSearchP}$ and Squal>$S_{nonIntraSearchQ}$, the UE may choose not to perform measurements on NR inter-frequencies or inter-RAT frequency cells of equal or lower priority. However, the UE shall not refrain from measuring on NR inter-frequencies or inter-RAT frequencies with a reselection priority higher than the reselection priority of the current NR frequency.

The cell reselection rules in 3GPP TS 38.304 further limits the maximum frequency of cell reselections to once per second, i.e. according to the specified cell reselection rules a UE must camp on a cell for at least one second before it can reselect to another cell. In addition, a cell reselection condition, in terms of measured neighbor cell quality (and, when applicable, serving cell quality) must be fulfilled during the time period $Treselection_{RAT}$ before it can trigger a cell reselection, where $Treselection_{RAT}$ is configurable in the range 0-7 seconds.

The use of a hysteresis, realized by the configurable $Q_{hyst}$ parameter in the ranking formula for the serving cell (i.e. in the formula $R_s=Q_{meas,s}+Q_{hyst}-Qoffset_{temp}$) also serves to reduce the frequency of cell reselections, as it favors remaining in the current serving cell.

Furthermore, for 3GPP release 16 of NR, a means has been specified for the network to configure a UE to be allowed to relax its neighbor cell measurements for cell reselection evaluation when certain conditions are fulfilled which indicate that the need or probability for a cell reselection in the near future is low. Similar means was also been specified for NB-IoT and LTE-M devices that were introduced to provide connectivity to massive machine type communication (mMTC) services.

Another means is available, which does not reduce the number or frequency of neighbor cell measurements, but instead reduces the effort a UE spends on a neighbor cell measurement. This is the Synchronization Signal Block (SSB) Measurement Timing Configuration (SMTC), by which the network can configure a periodic time window per carrier frequency, in which the SSB transmissions that the RRC_IDLE or RRC_INACTIVE UE measures on occurs. For neighbor cell measurements in RRC_CONNECTED state, a UE may be configured with more advanced SMTC, including cell specific SMTC.

SS/PBCH Block or SSB Transmission

Note that Synchronization Signal (SS)/Physical Broadcast Channel (PBCH) and Synchronization Signal Block (SSB) are used interchangeably in this document. Two types of SSBs can be transmitted in NR:

SSB that has an associated SIB1 being transmitted, referred to as cell-defining (CD) SSB SSB that does not have an associated SIB1 being transmitted, referred to as non-cell-defining (non-CD) SSB SSBs (CD-SSB as well as non-CD-SSB) can be transmitted on or outside of the so-called synchronization raster. Transmitting the SSB on the synchronization means that the center frequency of the SSB is within a limited set of frequency-domain positions (the "synchronization raster") defined in the 3GPP NR specifications. Only SSBs on the synchronization raster can be found by UEs doing initial access. If the SSB also has an associated SSB, a Rel-16 UE as well as Rel-17 UE that accesses a terrestrial network (TN) can then perform initial access using this SSB. FIG. 3 illustrates an example of SSBs for a cell X.

System Information

System information (SI) is an important function in cellular communication systems. It provides the wireless devices, UEs, with the information needed to access the network and to perform other functions, such as reselecting between cells and receiving Multimedia Broadcast Multicast Services (MBMS) transmissions in a cellular network operating in accordance with a 3GPP standard. In addition, in 3GPP cellular systems the system information mechanism is used for conveying Public Warning System messages, such as Earthquake and Tsunami Warning System (ETWS) messages and Commercial Mobile Alert System (CMAS) messages in 3GPP cellular communication systems.

In LTE, the system information is provided using periodic broadcasting in each cell. The SI is divided into a Master Information Block (MIB) and a number of System Information Blocks (SIBs). The MIB and SIB1 are broadcast with periods that are fixed in the standard. The other SIBs are broadcast with different periods, as configured in SIB1.

For the 5G system referred to as New Radio (NR) (where the Radio Access Network, RAN, is referred to as Next Generation Radio Access Network (NG-RAN) and the core network is referred to as Next Generation Core (NGC)) 3GPP has partly changed the principles for distribution of system information (SI) that are used in E-UTRAN (LTE).

System Information (SI) is divided into the MIB and a number of SIBs and posSIBs where:

the MIB is always transmitted on the Broadcast Channel (BCH) with a periodicity of 80 ms and repetitions made within 80 ms (TS 38.212 [17], clause 7.1) and it includes parameters that are needed to acquire SIB1 from the cell. The first transmission of the MIB is scheduled in subframes as defined in TS 38.213 [13], clause 4.1 and repetitions are scheduled according to the period of SSB;

the SIB1 is transmitted on the DL-SCH with a periodicity of 160 ms and variable transmission repetition periodicity within 160 ms as specified in TS 38.213 [13], clause 13. The default transmission repetition periodicity of SIB1 is 20 ms but the actual transmission repetition periodicity is up to network implementation. For SSB and CORESET multiplexing pattern 1, SIB1 repetition transmission period is 20 ms. For SSB and CORESET multiplexing pattern 2/3, SIB1 transmission Repetition period is the same as the SSB period (TS 38.213 [13], clause 13). SIB1 includes information regarding the availability and scheduling (e.g. mapping of SIBs to SI message, periodicity, SI-window size) of other SIBs with an indication whether one or more SIBs are only provided on-demand and, in that case, the configuration needed by the UE to perform the SI request. SIB1 is cell-specific SIB;

For NR the SI is into "minimum SI" and "other SI", where the minimum SI is the SI that is required to access the cell, and, in the case of NR stand-alone mode (i.e. not in dual connection configuration with LTE), the minimum SI also contains scheduling information for the SIBs of the other SI. The minimum SI consists of the Master Information Block (MIB) and System Information Block type 1 (SIB1). SIB1 is also referred to as "Remaining Minimum System Information" (RMSI). At least in NR stand-alone mode, the minimum SI is periodically broadcast in a cell, while the other SI may be either periodically broadcast or delivered on-demand, triggered by a request from a UE. The granularity of the division into periodically broadcast SI and on-demand SI is on the level of SI messages. Whether a certain SI message is periodically broadcast or provided on-demand is indicated in SIB1 (using the si-BroadcastStatus parameter). A UE in RRC_IDLE, RRC_INACTIVE or RRC_CONNECTED state can request an on-demand SI message either using a random access preamble (referred to as the Msg1 based method) or using a random access message 3 (referred to as the Msg3 based method).

If random access preamble (Msg1) transmissions are used, there may be different preambles for requesting different SI message(s) (and consequently the SIB(s) allocated to the SI message(s)) of the other SI. The mapping between a random access preamble and the SI message to be requested is configured in SIB1. If random access message 3 (Msg3) transmissions are used, a UE may in such a message specify which SI message(s) (and consequently the SIB(s) allocated to the SI message(s)) of the other SI the UE wants the network to broadcast/transmit. A request for an on-demand SI message triggers the network to broadcast the requested SI message for a limited time in accordance with the scheduling information associated with the concerned SI message in SIB1. The network will also transmit an acknowledgement message to the requesting UE. For the Msg1 based request method, the network responds with an acknowledging random access message 2 (Msg2). For the Msg3 based requests method, the network responds with an acknowledging random access message 4 (Msg4).

Periodic broadcast of system information (SI) is designed mostly according to the same principles in NR as in LTE. Similar to LTE, the Master Information Block (MIB) is transmitted in a fixed location in relation to the synchronization signals. The situation for SIB1 is slightly different in NR than in LTE. The periodicity of SIB1 is 160 ms, but it may be repeated a number of times within these 160 ms and the transmission configuration is indicated in the MIB. The remaining SIBs are scheduled in SIB1 and transmitted on the Physical Downlink Shared Channel (PDSCH) in the same way as in LTE. Different SIBs can have different periodicities. SIBs with the same periodicity are allocated to the same SI message and every SI message is associated with a periodic SI-window within which the SI message should be transmitted. The SI-windows of the different SI messages have different periodicities, are non-overlapping and they all have the same duration. Note that the exact transmission occasion of an SI message is not configured, only the window within which it will be transmitted. To indicate that a PDSCH transmission contains an SI message, the CRC of the PDCCH scheduling DCI which allocates the PDSCH transmission resources is scrambled with the System Information-Radio Network Temporary Identifier (SI-RNTI)). A receiving UE leverages the non-overlapping property of the SI-windows to identify which SI message it receives (and hence which SIBs the SI message contains), the SI messages in themselves do not have any indication to distinguish one SI message from the other. The principle of allocating SIBs to SI messages and scheduling of SI messages in SI-windows is illustrated in FIG. 4. See FIG. 4 (allocation of SIBs to SI messages and scheduling of SI messages in SI-windows. Each SI message is transmitted in its own SI-window, whose occurrence in time depends on the SI message periodicity and the SI message's position in the list in SIB1).

Note that every SI message has a configured schedule, irrespective of whether it is periodically broadcast or provided on-demand. In the latter case, the scheduled broadcast occasions are utilized only when the network, i.e. gNB, has received a request for the concerned SI message.

In NR, the ASN.1 definitions of MIB and SIB1, and associated field descriptions (from TS 38.331) are indicated below:

MIB

The MIB includes the system information transmitted on BCH.

Signalling radio bearer: N/A

RLC-SAP: TM

Logical channel: Broadcast Control Channel (BCCH)

Direction: Network to UE

MIB

```
-- ASN1START
-- TAG-MIB-START
MIB ::=                         SEQUENCE {
   systemFrameNumber                BIT STRING (SIZE (6)),
   subCarrierSpacingCommon          ENUMERATED {scs15or60, scs30or120},
   ssb-SubcarrierOffset             INTEGER (0..15),
   dmrs-TypeA-Position              ENUMERATED {pos2, pos3},
   pdcch-ConfigSIB1                 PDCCH-ConfigSIB1,
   cellBarred                       ENUMERATED {barred, notBarred},
   intraFreqReselection             ENUMERATED {allowed, notAllowed},
   spare                            BIT STRING (SIZE (1))
}
-- TAG-MIB-STOP
-- ASN1STOP
```

| MIB field descriptions |
| --- |
| cellBarred<br>Value barred means that the cell is barred, as defined in TS 38.304 [20]. This field is ignored by IAB-MT. |
| dmrs-TypeA-Position<br>Position of (first) Demodulation Reference Signal (DM-RS) for downlink (see TS 38.211 [16], clause 7.4.1.1.2) and uplink (see TS 38.211 [16], clause 6.4.1.1.3). |
| intraFreqReselection<br>Controls cell selection/reselection to intra-frequency cells when the highest ranked cell is barred, or treated as barred by the UE, as specified in TS 38.304 [20]. This field is ignored by IAB-MT. |
| pdcch-ConfigSIB1<br>Determines a common ControlResourceSet (CORESET), a common search space and necessary PDCCH parameters. If the field ssb-SubcarrierOffset indicates that SIB1 is absent, the field pdcch-ConfigSIB1 indicates the frequency positions where the UE may find SS/PBCH block with SIB1 or the frequency range where the network does not provide SS/PBCH block with SIB1 (see TS 38.213 [13], clause 13). |
| ssb-SubcarrierOffset<br>Corresponds to $k_{SSB}$ (see TS 38.213 [13]), which is the frequency domain offset between SSB and the overall resource block grid in number of subcarriers. (See TS 38.211 [16], clause 7.4.3.1).<br>The value range of this field may be extended by an additional most significant bit encoded within PBCH as specified in TS 38.213 [13].<br>This field may indicate that this cell does not provide SIB1 and that there is hence no CORESET#0 configured in MIB (see TS 38.213 [13], clause 13). In this case, the field pdcch-ConfigSIB1 may indicate the frequency positions where the UE may (not) find a SS/PBCH with a control resource set and search space for SIB1 (see TS 38.213 [13], clause 13). |
| subCarrierSpacingCommon<br>Subcarrier spacing for SIB1, Msg.2/4 for initial access, paging and broadcast SI-messages. If the UE acquires this MIB on an FR1 carrier frequency, the value scs15or60 corresponds to 15 kHz and the value scs30or120 corresponds to 30 kHz. If the UE acquires this MIB on an FR2 carrier frequency, the value scs15or60 corresponds to 60 kHz and the value scs30or120 corresponds to 120 kHz. For operation with shared spectrum channel access (see 37.213 [48]), the subcarrier spacing for SIB1 is same as that for the corresponding SSB and this Information Element (IE) instead is used for deriving the QCL relationship between SS/PBCH blocks in a serving cell as specified in TS 38.213 [13], clause 4.1. |
| systemFrameNumber<br>The 6 most significant bits (MSB) of the 10-bit System Frame Number (SFN). The 4 LSB of the SFN are conveyed in the PBCH transport block as part of channel coding (i.e. outside the MIB encoding), as defined in clause 7.1 in TS 38.212 [17]. |

Two parameters in the MIB (see above) provides information that assists UEs to find the PDCCH associated with SIB1 transmissions.

The ssb-SubCarrierOffset provides information about the frequency offset between the detected SSB (the SSB within which the MIB is transmitted) and the so-called Common Resource Block (CRB) grid.

The pdcch-ConfigSIB1 provides further details of the PDCH transmission.

We can see that ssb-Subcarrieroffset can take 16 different values (0-15)

Values of ssb-Subcarrieroffset from the set {0, 1, 2, . . . , 11} indicates the frequency offset between the detected SSB and CRB grid (as a resource-block consists of 12 subcarriers, the frequency offset of up to 11 subcarriers)

Values of ssb-Subcarrieroffset from the set {12, 13, 14, 15}) indicates to a UE that there is no SIB1 associated with the SSB It should be pointed out that, for the so-called frequency range 1 (FR1). that is, for carrier frequencies below 6 GHz, the ssb-SubCarrierOffset is extended with one additional bit transmitted on the PBCH but outside of the MIB. This leads to a total of 32 different values (0-31) out of which values from the set {0, 1, 2, . . . 23} indicate the frequency offset between the detected SSB and the CRB grid and values from the set {24, . . . , 31} indicate that there is no associated SIB1.

SIB1

SIB1 contains information relevant when evaluating if a UE is allowed to access a cell and defines the scheduling of other system information. It also contains radio resource configuration information that is common for all UEs and barring information applied to the unified access control.

Signalling radio bearer: N/A

RLC-SAP: TM

Logical channels: BCCH

Direction: Network to UE

SIB1 Message

```
-- ASN1START
-- TAG-SIB1-START
SIB1 ::=                SEQUENCE {
   cellSelectionInfo              SEQUENCE {
      q-RxLevMin                       Q-RxLevMin,
      q-RxLevMinOffset                       INTEGER (1..8)
OPTIONAL,            -- Need S
      q-RxLevMinSUL                          Q-RxLevMin
OPTIONAL,            -- Need R
      q-QualMin                    Q-QualMin                    OPTIONAL,   --
Need S
      q-QualMinOffset                   INTEGER (1..8)                OPTIONAL
-- Need S
   }                                                          OPTIONAL,   -- Cond
Standalone
   cellAccessRelatedInfo               CellAccessRelatedInfo,
   connEstFailureControl                ConnEstFailureControl
OPTIONAL,            -- Need R
   si-SchedulingInfo              SI-SchedulingInfo                 OPTIONAL,
-- Need R
   servingCellConfigCommon               ServingCellConfigCommonSIB
OPTIONAL,            -- Need R
   ims-EmergencySupport                ENUMERATED {true}
OPTIONAL,            -- Need R
   eCallOverIMS-Support              ENUMERATED {true}
OPTIONAL,            -- Need R
   ue-TimersAndConstants                UE-TimersAndConstants
OPTIONAL,            -- Need R
   uac-BarringInfo                SEQUENCE {
      uac-BarringForCommon                        UAC-BarringPerCatList
OPTIONAL,            -- Need S
      uac-BarringPerPLMN-List                     UAC-BarringPerPLMN-List
OPTIONAL,            -- Need S
      uac-BarringInfoSetList               UAC-BarringInfoSetList,
      uac-AccessCategory1-SelectionAssistanceInfo CHOICE {
         plmnCommon                    UAC-AccessCategory1-SelectionAssistanceInfo,
         individualPLMNList                     SEQUENCE (SIZE (2..maxPLMN)) OF UAC-
AccessCategory1-SelectionAssistanceInfo
      }                                                         OPTIONAL   -- Need S
   }                                                          OPTIONAL,   -- Need R
   useFullResumeID              ENUMERATED {true}
OPTIONAL,            -- Need R
   lateNonCriticalExtension             OCTET STRING
OPTIONAL,
   nonCriticalExtension              SIB1-v1610-IEs                 OPTIONAL
}
SIB1-v1610-IEs ::=              SEQUENCE {
   idleModeMeasurementsEUTRA-r16                     ENUMERATED{true}
OPTIONAL,           -- Need R
   idleModeMeasurementsNR-r16            ENUMERATED{true}
OPTIONAL,           -- Need R
   posSI-SchedulingInfo-r16            PosSI-SchedulingInfo-r16
OPTIONAL,           -- Need R
   nonCriticalExtension              SEQUENCE { }
```

-continued

```
OPTIONAL
}
UAC-AccessCategory1-SelectionAssistanceInfo ::=   ENUMERATED {a, b, c}
-- TAG-SIB1-STOP
-- ASN1STOP
```

| SIB1 field descriptions |
| --- |
| cellSelectionInfo<br>Parameters for cell selection related to the serving cell. |
| eCallOverIMS-Support<br>Indicates whether the cell supports eCall over IMS services as defined in TS 23.501 [32]. If absent, eCall over IMS is not supported by the network in the cell. |
| idleModeMeasurementsEUTRA<br>This field indicates that a UE that is configured for EUTRA idle/inactive measurements shall perform the measurements while camping in this cell and report availability of these measurements when establishing or resuming a connection in this cell. If absent, a UE is not required to perform EUTRA idle/inactive measurements. |
| idleModeMeasurementsNR<br>This field indicates that a UE that is configured for NR idle/inactive measurements shall perform the measurements while camping in this cell and report availability of these measurements when establishing or resuming a connection in this cell. If absent, a UE is not required to perform NR idle/inactive measurements. |
| ims-EmergencySupport<br>Indicates whether the cell supports IMS emergency bearer services for UEs in limited service mode. If absent, IMS emergency call is not supported by the network in the cell for UEs in limited service mode. |
| q-QualMin<br>Parameter "$Q_{qualmin}$" in TS 38.304 [20], applicable for serving cell. If the field is absent, the UE applies the (default) value of negative infinity for $Q_{qualmin}$. |
| q-QualMinOffset<br>Parameter "$Q_{qualminoffset}$" in TS 38.304 [20]. Actual value $Q_{qualminoffset}$ = field value [dB]. If the field is absent, the UE applies the (default) value of 0 dB for $Q_{qualminoffset}$. Affects the minimum required quality level in the cell. |
| q-RxLevMin<br>Parameter "$Q_{rxlevmin}$" in TS 38.304 [20], applicable for serving cell. |
| q-RxLevMinOffset<br>Parameter "$Q_{rxlevminoffset}$" in TS 38.304 [20]. Actual value $Q_{rxlevminoffset}$ = field value * 2 [dB]. If absent, the UE applies the (default) value of 0 dB for $Q_{rxlevminoffset}$. Affects the minimum required Rx level in the cell. |
| q-RxLevMinSUL<br>Parameter "$Q_{rxlevmin}$" in TS 38.304 [20], applicable for serving cell. |
| servingCellConfigCommon<br>Configuration of the serving cell. |
| uac-AccessCategory1-SelectionAssistanceInfo<br>Information used to determine whether Access Category 1 applies to the UE, as defined in TS 22.261 [25]. |
| uac-BarringForCommon<br>Common access control parameters for each access category. Common values are used for all PLMNs, unless overwritten by the PLMN specific configuration provided in uac-BarringPerPLMN-List. The parameters are specified by providing an index to the set of configurations (uac-BarringInfoSetList). UE behaviour upon absence of this field is specified in clause 5.3.14.2. |
| ue-TimersAndConstants<br>Timer and constant values to be used by the UE. The cell operating as Primary Cell (PCell) always provides this field. |
| useFullResumeID<br>Indicates which resume identifier and Resume request message should be used. UE uses full Inactive-Radio Network Temporary Identifier (fullI-RNTI) and RRCResumeRequest1 if the field is present, or shortI-RNTI and RRCResumeRequest if the field is absent. |

| Conditional Presence | Explanation |
|---|---|
| Standalone | The field is mandatory present in a cell that supports standalone operation, otherwise it is absent. |

Similar definitions and descriptions are captured in TS 36.331 in E-UTRAN although for LTE, there is no sync raster defined as the MIB is always found at center of the LTE carrier.

MasterInformationBlock

The MasterInformationBlock includes the system information transmitted on BCH.

Signalling radio bearer: N/A

RLC-SAP: TM

Logical channel: BCCH

Direction: E-UTRAN to UE

MasterInformationBlock

```
-- ASN1START
MasterInformationBlock ::=          SEQUENCE {
   dl-Bandwidth                     ENUMERATED {
                                       n6, n15, n25, n50, n75, n100},
   phich-Config                     PHICH-Config,
   systemFrameNumber                   BIT STRING (SIZE (8)),
   schedulingInfoSIB1-BR-r13           INTEGER (0..31),
   systemInfoUnchanged-BR-r15          BOOLEAN,
   spare                            BIT STRING (SIZE (4))
}
-- ASN1STOP
```

| MasterInformationBlock field descriptions |
|---|
| dl-Bandwidth<br>Parameter: transmission bandwidth configuration, $N_{RB}$ in downlink, see TS 36.101 [42], table 5.6-1. n6 corresponds to 6 resource blocks, n15 to 15 resource blocks and so on. |
| phich-Config<br>Specifies the Physical Hybrid-Automatic Repeat Request Indicator Channel (PHICH) configuration. If the UE is a BL UE or UE in CE, it shall ignore this field. |
| schedulingInfoSIB1-BR<br>Indicates the index to the tables that define SystemInformationBlockType1-BR scheduling information. The tables are specified in TS 36.213 [23], Table 7.1.6-1 and Table 7.1.7.2.7-1. Value 0 means that SystemInformationBlockType1-BR is not scheduled. |
| systemFrameNumber<br>Defines the 8 most significant bits of the SFN. As indicated in TS 36.211 [21], 6.6.1, the 2 least significant bits of the SFN are acquired implicitly in the P-BCH decoding, i.e. timing of 40 ms P-BCH Transmission Time Interval (TTI) indicates 2 least significant bits (within 40 ms P-BCH TTI, the first radio frame: 00, the second radio frame: 01, the third radio frame: 10, the last radio frame: 11). One value applies for all serving cells of a Cell Group (i.e. MCG or SCG). The associated functionality is common (i.e. not performed independently for each cell). |
| systemInfoUnchanged-BR<br>Value TRUE indicates that no change has occurred in the SIB1-BR and SI messages at least over the SI validity time. |

SystemInformationBlockType1

SystemInformationBlockType1 contains information relevant when evaluating if a UE is allowed to access a cell and defines the scheduling of other system information. SystemInformationBlockType1-BR uses the same structure as SystemInformationBlockType1.

Signalling radio bearer: N/A
RLC-SAP: TM
Logical channels: BCCH and BR-BCCH
Direction: E-UTRAN to UE
end of text SystemInformationBlockType1 Message

```
-- AN1START
SystemInformationBlockType1-BR-r13 ::= SystemInformationBlockType1
SysteminformationBlockType1 ::=       SEQUENCE {
  cellAccessRelatedInfo               SEQUENCE {
    plmn-IdentityList                   PLMN-IdentityList,
    trackingAreaCode                    TrackingAreaCode,
    cellIdentity                      CellIdentity,
    cellBarred                          ENUMERATED {barred, notBarred},
    intraFreqReselection                ENUMERATED {allowed, notAllowed},
    csg-Indication                      BOOLEAN,
    csg-Identity                      CSG-Identity                  OPTIONAL      -- Need OR
  },
  cellSelectionInfo                   SEQUENCE {
    q-RxLevMin                            Q-RxLevMin,
    q-RxLevMinOffset                    INTEGER (1..8)                  OPTIONAL   --
Need OP
  },
  p-Max                               P-Max                             OPTIONAL,      --
Need OP
  freqBandIndicator                   FreqBandIndicator,
  schedulingInfoList                  SchedulingInfoList,
  tdd-Config                          TDD-Config                          OPTIONAL,   --
Cond TDD
  si-WindowLength                       ENUMERATED {
                                        ms1, ms2, ms5, ms10, ms15, ms20,
                                        ms40},
  systemInfoValueTag                    INTEGER (0..31),
  nonCriticalExtension                SystemInformationBlockType1-v890-IEs
  OPTIONAL
}
SystemInformationBlockType1-v890-IEs::=  SEQUENCE {
  lateNonCriticalExtension            OCTET STRING (CONTAINING
SystemInformationBlockType1-v8h0-IEs)          OPTIONAL,
  nonCriticalExtension                SystemInformationBlockType1-v920-IEs
  OPTIONAL
}
-- Late non critical extensions
SystemInformationBlockType1-v8h0-IEs ::=  SEQUENCE {
  multiBandInfoList                   MultiBandInfoList             OPTIONAL,   -- Need OR
  nonCriticalExtension                SystemInformationBlockType1-v9e0-IEs
  OPTIONAL
}
SystemInformationBlockType1-v9e0-IEs ::= SEQUENCE {
  freqBandIndicator-v9e0                FreqBandIndicator-v930                OPTIONAL,   --
Cond FBI-max
  multiBandInfoList-v9e0                MultiBandInfoList-v9e0              OPTIONAL,   --
Cond mFBI-max
  nonCriticalExtension                SystemInformationBlockType1-v10j0-IEs
  OPTIONAL
}
SystemInformationBlockType1-v10j0-IEs ::= SEQUENCE {
  freqBandInfo-r10                    NS-PmaxList-r10                   OPTIONAL,   --
Need OR
  multiBandInfoList-v10j0               MultiBandInfoList-v10j0             OPTIONAL,   --
Need OR
  nonCriticalExtension                SystemInformationBlockType1-v10l0-IEs
OPTIONAL
}
SystemInformationBlockType1-v10l0-IEs ::= SEQUENCE {
  freqBandInfo-v10l0                  NS-PmaxList-v10l0                   OPTIONAL,   --
Need OR
  multiBandInfoList-v10l0               MultiBandInfoList-v10l0               OPTIONAL,   --
Need OR
  nonCriticalExtension                SystemInformationBlockType1-v10x0-IEs
  OPTIONAL
}
SystemInformationBlockType1-v10x0-IEs ::= SEQUENCE {
  -- This field is only for late non-critical extensions from Rel-10 or Rel-11 onwards
  lateNonCriticalExtensions           OCTET STRING
  OPTIONAL
  nonCriticalExtension                SystemInformationBlockType1-v12j0-IEs
  OPTIONAL
}
```

-continued

```
SystemInformationBlockType1-v12j0-IEs ::= SEQUENCE {
   schedulingInfoList-v12j0              SchedulingInfoList-v12j0              OPTIONAL,    -- Need
OR
   schedulingInfoListExt-r12             SchedulingInfoListExt-r12             OPTIONAL,    -- Need
OR
   nonCriticalExtension                  SEQUENCE { }                              OPTIONAL
}
-- Regular non critical extensions
SystemInformationBlockType1-v920-IEs ::=   SEQUENCE {
   ims-EmergencySupport-r9                 ENUMERATED {true}                          OPTIONAL,
-- Need OR
   cellSelectionInfo-v920                CellSelectionInfo-v920                OPTIONAL,    -- Cond
RSRQ
   nonCriticalExtension                  SystemInformationBlockType1-v1130-IEs
   OPTIONAL
}
SystemInformationBlockType1-v1130-IEs ::=   SEQUENCE {
   tdd-Config-v1130                      TDD-Config-v1130                    OPTIONAL,    -- Cond
TDD-OR
   cellSelectionInfo-v1130                 CellSelectionInfo-v1130             OPTIONAL,    --
Cond WB-RSRQ
   nonCriticalExtension                  SystemInformationBlockType1-v1250-IEs        OPTIONAL
}
SystemInformationBlockType1-v1250-IEs ::=   SEQUENCE {
   cellAccessRelatedInfo-v1250                 SEQUENCE {
      category0Allowed-r12                     ENUMERATED {true}
   OPTIONAL    -- Need OP
   },
   cellSelectionInfo-v1250                   CellSelectionInfo-v1250               OPTIONAL,
-- Cond RSRQ2
   freqBandIndicatorPriority-r12             ENUMERATED {true}                     OPTIONAL,
-- Cond mFBI
   nonCriticalExtension                  SystemInformationBlockType1-v1310-IEs        OPTIONAL,
}
SystemInformationBlockType1-v1310-IEs ::=   SEQUENCE {
   hyperSFN-r13                              BIT STRING (SIZE (10))                OPTIONAL,
-- Need OR
   eDRX-Allowed-r13                          ENUMERATED {true}
   OPTIONAL,    -- Need OR
   cellSelectionInfoCE-r13                   CellSelectionInfoCE-r13             OPTIONAL,    --
Need OP
   bandwidthReducedAccessRelatedInfo-r13     SEQUENCE {
      si-WindowLength-BR-r13                     ENUMERATED {
                                                 ms20, ms40, ms60, ms80, ms120,
                                                 ms160, ms200, spare},
      si-RepetitionPattern-r13               ENUMERATED {everyRF, every2ndRF,
every4thRF,
                                                    every8thRF},
      schedulingInfoList-Br-r13              SchedulingInfoList-BR-r13           OPTIONAL,    --
Cond SI-BR
      fdd-DownlinkOrTddSubframeBitmapBR-r13      CHOICE {
         subframePattern10-r13                   BIT STRING (SIZE (10)),
         subframePattern40-r13                   BIT STRING (SIZE (40))
      }                                                                    OPTIONAL,    --
Need OP
      fdd-UplinkSubframeBitmapBR-r13             BIT STRING (SIZE (10))
   OPTIONAL,    -- Need OP
      startSymbolBR-r13                      INTEGER (1..4),
      si-HoppingConfigCommon-r13                 ENUMERATED {on,off},
      si-ValidityTime-r13                        ENUMERATED {true}           OPTIONAL,
-- Need OP
      systemInfoValueTagList-r13             SystemInfoValueTagList-r13
   OPTIONAL,    -- Need OR
   }                                                                       OPTIONAL,    -- Cond
BW-reduced
   nonCriticalExtension                  SystemInformationBlockType1-v1320-IEs
   OPTIONAL
}
SystemInformationBlockType1-v1320-IEs ::=   SEQUENCE {
   freqHoppingParametersDL-r13               SEQUENCE {
      mpdcch-pdsch-HoppingNB-r13                 ENUMERATED {nb2, nb4}
   OPTIONAL,    -- Need OR
      interval-DLHoppingConfigCommonModeA-r13          CHOICE {
         interval-FDD-r13                    ENUMERATED {int1, int2, int4, int8},
         interval-TDD-r13                    ENUMERATED {int1, int5, int10, int20}
   }                                                                       OPTIONAL,    --
Need OR
   interval-DLHoppingConfigCommonModeB-r13       CHOICE {
         interval-FDD-r13                    ENUMERATED {int2, int3, int8, int16},
```

-continued

```
        interval-TDD-r13                    ENUMERATED { int5, int10, int20, int40}
    }                                                                   OPTIONAL,   --
Need OR
        mpdcch-pdsch-HoppingOffset-r13          INTEGER (1..maxAvailNarrowBands-
r13) OPTIONAL   -- Need OR
    }                                                         OPTIONAL,   -- Cond
Hopping
    nonCriticalExtension                    SystemInformationBlockType1-v1350-IEs
OPTIONAL
}
SystemInformationBlockType1-v1350-IEs ::=   SEQUENCE {
    cellSelectionInfoCE1-r13                CellSelectionInfoCE1-r13            OPTIONAL,   --
Need OP
    nonCriticalExtension                    SystemInformationBlockType1-v1360-IEs
OPTIONAL
}
SystemInformationBlockType1-v1360-IEs ::   SEQUENCE {
    cellSelectionInfoCE1-v1360                CellSelectionInfoCE1-v1360          OPTIONAL,
-- Cond QrxlevminCE1
    nonCriticalExtension                      SystemInformationBlockType1-v1430-IEs
OPTIONAL
}
SystemInformationBlockType1-v1430-IEs ::=   SEQUENCE {
    eCallOverIMS-Support-r14                ENUMERATED {true}                   OPTIONAL,
-- Need OR
    tdd-Config-v1430                        TDD-Config-v1430        OPTIONAL,   --
Cond TDD-OR
    cellAccessRelatedInfoList-r14           SEQUENCE (SIZE (1..maxPLMN-1-r14)) OF
                                            CellAccessRelatedInfo-r14   OPTIONAL,   --
Need OR
    nonCriticalExtension                    SystemInformationBlockType1-v1450-IEs
OPTIONAL
}
SystemInformationBlockType1-v1450-IEs ::=   SEQUENCE {
    tdd-Config-v1450                        TDD-Config-v1450        OPTIONAL,   -- Cond
TDD-OR
    nonCriticalExtension                    SystemInformationBlockType1-v1530-IEs
OPTIONAL
}
SystemInformationBlockType1-v1530-IEs ::=   SEQUENCE {
    hsdn-Cell-r15                         ENUMERATED {true}               OPTIONAL,   --
Need OR
    cellSelectionInfoCE-v1530             CellSelectionInfoCE-v1530OPTIONAL,      -- Need
OP
    crs-IntfMitigConfig-r15                 CHOICE {
        crs-IntfMitigEnabled                  NULL,
        crs-IntfMitigNumPRBs              ENUMERATED {n6, n24}
    }   OPTIONAL,   -- Need OR
    cellBarred-CRS-r15                      ENUMERATED {barred, notBarred},
    plmn-IdentityList-v1530                 PLMN-IdentityList-v1530           OPTIONAL,   --
Need OR
    posSchedulingInfoList-r15             PosSchedulingInfoList-r15   OPTIONAL,   -- Need
OR
    cellAccessRelatedInfo-5GC-r15           SEQUENCE {
        cellBarred-5GC-r15                    ENUMERATED {barred, notBarred},
        cellBarred-5GC-CRS-r15                ENUMERATED {barred, notBarred},
        cellAccessRelatedInfoList-5GC-r15     SEQUENCE (SIZE (1..maxPLMN-r11)) OF
                                            CellAccessRelatedInfo-5GC-r15
    }                       OPTIONAL,   -- Need OP
    ims-EmergencySupport5GC-r15               ENUMERATED {true}
    OPTIONAL   -- Need OR
    eCallOverIMS-Support5GC-r15               ENUMERATED {true}
    OPTIONAL   -- Need OR
        nonCriticalExtension                SystemInformationBlockType1-v1540-IEs
        OPTIONAL
    }
    SystemInformationBlockType1-v1540-IEs ::=   SEQUENCE {
        si-posOffset-r15                      ENUMERATED {true}
        OPTIONAL   -- Need OR
        nonCriticalExtension                  SystemInformationBlockType1-v1610-
    IEs OPTIONAL
    }
    SystemInformationBlockType1-v1610-IEs ::=   SEQUENCE {
        eDRX-Allowed-5GC-r16                ENUMERATED {true}                   OPTIONAL,
    -- Need OR
        transmissionInControlChRegion-r16   ENUMERATED {true}                 OPTIONAL,   --
    Cond BW-reduced
        campingAllowedInCE-r16              ENUMERATED {true}                   OPTIONAL,
    -- Need OR
```

-continued

```
    plmn-IdentityList-v1610                    PLMN-IdentityList-v1610              OPTIONAL,    --
  Need OR
    nonCriticalExtension                       SEQUENCE { }                    OPTIONAL
  }
  PLMN-IdentityList ::=                      SEQUENCE (SIZE (1..maxPLMN-r11)) OF PLMN-
  IdentityInfo
  PLMN-IdentityList ::=                      SEQUENCE {
    plmn-Identity                              PLMN-Identity,
    cellReservedForOperatorUse                   ENUMERATED {reserved, notReserved}
  }
  PLMN-IdentityList-v1530 ::=                  SEQUENCE (SIZE (1..maxPLMN-r11)) OF
  PLMN-IdentityList-v1530
  PLMN-IdentityList-v1530 ::=                  SEQUENCE {
    cellReservedForOperatorUse-CRS-r15           ENUMERATED {reserved, notReserved}
  }
  PLMN-IdentityList-r15::=                   SEQUENCE (SIZE (1..maxPLMN-r11)) OF PLMN-
  IndentityInfo-r15
  PLMN-IdentityList-v1610::=               SEQUENCE (SIZE (1..maxPLMN-r11)) OF PLMN-
  IdentityInfo-v1610
  PLMN-IdentityList-r15 ::=                  SEQUENCE {
    plmn-Identity-5GC-r15                      CHOICE{
    plmn-Identity-r15                        PLMN-Identity,
    plmn-Index-r15                           INTEGER (1..maxPLMN-r11)
  },
  cellReservedForOperatorUse-r15               ENUMERATED {reserved, notReserved},
  cellReservedForOperatorUse-CRS-r15           ENUMERATED {reserved, notReserved}
}
PLMN-IdentityInfo-v1610 ::=   SEQUENCE {
  cp-CIoT-5GS-Optimisation-r16ENUMERATED {true}                       OPTIONAL,    --
Need OR
  upCIoT-5GS-Optimisation-r16ENUMERATED {true}                       OPTIONAL,    --
Need OR
  iab-Support-r16                          ENUMERATED {true}       OPTIONAL    -- Need
OR
}
SchedulingInfoList ::= SEQUENCE (SIZE (1..maxSI-Message)) OF SchedulingInfo
SchedulingInfoList-v12j0 ::=    SEQUENCE (SIZE (1..maxSI-Message)) OF
SchedulingInfo-v12j0
SchedulingInfoListExt-r12 ::=    SEQUENCE (SIZE (1..maxSI-Message)) OF
SchedulingInfoExt-r12
ScheculingInfo ::= SEQUENCE {
  si-Periodicity                           SI-Periodicity-r12,
  sib-MappingInfo                            SIB-MappingInfo
}
SchedulingInfo-v12j0 ::=   SEQUENCE {
  sib-MappingInfo-v12j0                    SIB-MappingInfo-v12j0          OPTIONAL    --
Need OR
}
SchedulingInfoExt-r12 ::=   SEQUENCE {
  si-Periodicity-r12                       SI-Periodicity-r12,
  sib-MappingInfo-r12                        SIB-MappingInfo-v12j0
}
SchedulingInfoList-BR-r13 ::= SEQUENCE (SIZE (1..maxSI-Message)) OF SchedulingInfo-
BR-r13
SchedulingInfo-BR-r13 ::= SEQUENCE {
  si-Narrowband-r13                        INTEGER (1..maxAvailNarrowBands-r13),
  si-TBS-r13                               ENEMERATED {b152, b208, b256, b408, b504, b600,
b712, b808, b936}
}
SIB-MappingInfo ::= SEQUENCE (SIZE (0..maxSIB-1)) OF SIB-Type
SIB-MappingInfo-v12j0 ::=SEQUENCE (SIZE (1..maxSIB-1)) OF SIB-Type-v12j0
SIB-Type ::=                               ENEMERATED {
                                             sibType3, sibType4, sibType5, sibType6,
                                             sibType7, sibType8, sibType9, sibType10,
                                             sibType11, sibType12-v920, sibType13-v920,
                                             sibType14-v1130, sibType15-v1130,
                                             sibType16-v1130, sibType17-v1250, sibType18-
v1250,
                                             ..., sibType19-v1250, sibType20-v1310, sibType21-
v1430,
                                             sibType24-v1530, sibType25-v1530, sibType26-
v1530,
                                             sibType26a-v1610, sibType27-v1610, sibType28-
v1610,
                                             sibType29-v1610}
SIB-Type-v12j0 ::=                  ENUMERATED {
                                      sibType19-v1250, sibType20-v1310, sibType21-v1430,
                                      sibType24-v1530, sibType25-v1530, sibType26-v1530,
                                      sibType26a-v1610, sibType27-v1610, sibType28-v1610,
```

-continued

```
                                sibType29-v1610, spare6, spare5,
                                spare4, spare3, spare2, spare1, ...}
SI-Periodicity-r12 ::=          ENUMERATED {rf8, rf16, rf32, rf64, rf128, rf256, rf512}
SystemInfoValueTagList-r13 ::=              SEQUENCE (SIZE (1..maxSI-Message)) OF
SystemInfoValueTagSI-r13
SystemInfoValueTagSI-r13 ::=              INTEGER (0..3)
CellSelectionInfo-v920 ::=                SEQUENCE {
   q-QualMin-r9                             Q-QualMin-r9,
   q-QualMinOffset-r9                         INTEGER (1..8)
   OPTIONAL   -- Need OP
}
CellSelectionInfo-v1130 ::=               SEQUENCE {
   q-QualMinWB-r11                          Q-QualMin-r9,
}
CellSelectionInfo-v1250 ::=               SEQUENCE {
   q-QualMinRSRQ-OnAllSymbols-r12               Q-QualMin-r9
}
CellAccessRelatedInfo-r14 ::=   SEQUENCE {
   plmn-IdentityList-r14                    PLMN-IdentityList
   trackingAreaCode-r14                     TrackingAreaCode,
   cellIdentity-r14                       CellIdentity
}
CellAccessRelatedInfo-5GC-r15 ::=           SEQUENCE {
   plmn-IdentityList-r15                  PLMN-IdentityList-r15,
   ran-AreaCode-r15                         RAN-AreaCode-r15 OPTIONAL,    -- Need OR
   trackingAreaCode-5GC-r15                   TrackingAreaCode-5GC-r15,
   cellIdentity-5GC-r15                     CellIdentity-5GC-r15
}
CellIdentity-5GC-r15 ::= CHOICE{
   cellIdentity-r15 CellIdentity
   cellId-Index-r15       INTEGER (1..maxPLMN-r11)
}
PosSchedulingInfoList-r15 ::= SEQUENCE (SIZE (1..maxSI-Message)) OF
PosSchedulingInfo-r15
PosSchedulingInfo-r15 ::= SEQUENCE {
   posSI-Periodicity-r15                  ENUMERATED {rf8, rf16, rf32, rf64, rf128, rf256, rf512},
   posSIB-MappingInfo-r15                   PosSIB-MappingInfo-r15
}
PosSIB-MappingInfo-r15 ::= SEQUENCE (SIZE (1..maxSIB)) OF PosSIB-Type-r15
PosSIB-Type-r15 ::= SEQUENCE {
   encrypted-r15          ENUMERATED { true }                  OPTIONAL,            -- Need
OP
   gnss-id-r15            GNSS-ID-r15                       OPTIONAL,            -- Need OP
   sbas-id-r15            SBAS-ID-r15                       OPTIONAL,            -- Need OP
   posSibType-r15           ENUMERATED { posSibType1-1,
                                posSibType1-2,
                                posSibType1-3,
                                posSibType1-4,
                                posSibType1-5,
                                posSibType1-6,
                                posSibType1-7,
                                posSibType2-1,
                                posSibType2-2,
                                posSibType2-3,
                                posSibType2-4,
                                posSibType2-5,
                                posSibType2-6,
                                posSibType2-7,
                                posSibType2-8,
                                posSibType2-9,
                                posSibType2-10,
                                posSibType2-11,
                                posSibType2-12,
                                posSibType2-13,
                                posSibType2-14,
                                posSibType2-15,
                                posSibType2-16,
                                posSibType2-17,
                                posSibType2-18,
                                posSibType2-19,
                                posSibType3-1,
                                ...,
                                posSibType1-8-v1610,
                                posSibType2-20-v1610,
                                posSibType2-21-v1610,
                                posSibType2-22-v1610,
                                posSibType2-23-v1610,
                                posSibType2-24-v1610,
                                posSibType2-25-v1610,
```

-continued

```
                              posSibType4-1-v1610,
                              posSibType5-1-v1610
   },
   ...
}
-- AN1STOP
```

| SystemInformationBlockType1 field descriptions |
|---|
| bandwithReducedAccessRelatedInfo<br>Access related information for BL UEs and UEs in CE. NOTE 3. |
| campingAllowedInCE<br>Indicates whether non-BL UE is allowed to camp in the non-standalone BL cell in enhanced coverage mode when S-criterion for normal coverage is fulfilled. The field is not applicable for standalone BL cell. |
| category0Allowed<br>The presence of this field indicates category 0 UEs are allowed to access the cell. |
| cellAccessRelatedInfoList<br>This field contains a list allowing signalling of access related information per PLMN. One PLMN can be included in only one entry of this list. NOTE 4. |
| cellAccessRelatedInfoList-5GC<br>This field contains a PLMN list and a list allowing signalling of access related information per PLMN for PLMNs that provides connectivity to 5GC. One PLMN can be included in only one entry of this list. NOTE4 |
| cellBarred, cellBarred-CRS<br>barred means the cell is barred, as defined in TS 36.304 [4]. |
| cellBarred-5GC, cellBarred-5GC-CRS<br>barred means the cell is barred for connectivity to 5GC, as defined in TS 36.304 [4]. |
| cellIdentity<br>Indicates the cell identity. NOTE 2. |
| cellId-Index<br>The index of the cell ID in the PLMN lists for EPC, indicates UE the corresponding cell ID is used for 5GC. Value 1 indicates the cell ID of the 1st PLMN list for EPC in the SIB1. Value 2 indicates the cell ID of the 2nd PLMN list for EPC, and so on. |
| cellReservedForOperatorUse, cellReservedForOperatorUse-CRS<br>As defined in TS 36.304 [4]. |
| cellSelectionInfoCE<br>Cell selection information for BL UEs and UEs in CE. If absent, coverage enhancement S criteria is not applicable. NOTE 3. |
| cellSelectionInfoCE1<br>Cell selection information for BL UEs and UEs in CE supporting CE Mode B. E-UTRAN includes this IE only if cellSelectionInfoCE is present in SystemInformationBlockType1-BR. NOTE 3. |
| cp-CIoT-5GS-Optimisation<br>Indicates whether the UE is allowed to establish the connection with Control plane CIoT 5GS optimisation, see TS 24.501 [95]. |
| crs-IntfMitigConfig<br>crs-IntfMitigEnabled indicates CRS interference mitigation is enabled for the cell, as specified in TS 36.133 [16], clause 3.6.1.1. For BL UEs or UEs in CE supporting ce-CRS-IntfMitig, presence of crs-IntfMitigNumPRBs indicates CRS interference mitigation is enabled in the cell, as specified in TS 36.133 [16], clauses 3.6.1.2 and 3.6.1.3, and the value of crs-IntfMitigNumPRBs indicates number of PRBs, i.e. 6 or 24 PRBs, for CRS transmission in the central cell BW when CRS interference mitigation is enabled. For UEs not supporting this feature, the behaviour is undefined if this field is configured and the field cellBarred in SystemInformationBlockType1 (SystemInformationBlockType1-BR for BL UEs or UEs in CE) is set to notbarred. |
| csg-Identity<br>Identity of the Closed Subscriber Group the cell belongs to. |
| csg-Indication<br>If set to TRUE the UE is only allowed to access the cell if it is a CSG member cell, if selected during manual CSG selection or to obtain limited service, see TS 36.304 [4]. |
| eCallOverIMS-Support<br>Indicates whether the cell supports eCall over IMS services via EPC for UEs as defined in TS 23.401 [41]. If absent, eCall over IMS via EPC is not supported by the network in the cell. NOTE 2. |
| eCallOverIMS-Support5GC<br>Indicates whether the cell supports eCall over IMS services via 5GC as defined in TS 23.401 [41]. If absent, eCall over IMS via 5GC is not supported by the network in the cell. NOTE 2. |
| eDRX-Allowed<br>The presence of this field indicates if idle mode extended Discontinuous Reception (DRX) is allowed in the cell for the UE connected to EPC. The UE shall stop using extended DRX in idle mode if eDRX-Allowed is not present when connected to EPC. |
| eDRX-Allowed-5GC |

-continued

| SystemInformationBlockType1 field descriptions |
| --- |
| The presence of this field indicates if idle mode extended DRX is allowed in the cell for the UE connected to 5GC. The UE shall stop using extended DRX in idle mode if eDRX-Allowed-5GC is not present when connected to 5GC. |
| encrypted |
| The presence of this field indicates that the posSibType is encrypted as specified in TS 36.355 [54]. |
| fdd-DownlinkOrTddSubframeBitmapBR |
| The set of valid subframes for Frequency Division Duplex (FDD) downlink or Time Division Duplex (TDD) transmissions, see TS 36.213 [23]. |
| If this field is present, SystemInformationBlockType1-BR-r13 is transmitted in RRCConnectionReconfiguration, and if RRCConnectionReconfiguration does not include systemInformationBlockType2Dedicated, UE may assume the valid subframes in fdd-DownlinkOrTddSubframeBitmapBR are not indicated as Multimedia Broadcast multicast service Single Frequency Network (MBSFN) subframes. If this field is not present, the set of valid subframes is the set of non-MBSFN subframes as indicated by mbsfn-SubframeConfigList. If neither this field nor mbsfn-SubframeConfigList is present, all subframes are considered as valid subframes for FDD downlink transmission, all downlink (DL) subframes according to the uplink-downlink configuration (see TS 36.211 [21]) are considered as valid subframes for TDD DL transmission, and all uplink (UL) subframes according to the uplink-downlink configuration (see TS 36.211 [21]) are considered as valid subframes for TDD UL transmission. |
| The first/leftmost bit corresponds to the subframe #0 of the radio frame satisfying SFN mod x = 0, where x is the size of the bit string divided by 10. Value 0 in the bitmap indicates that the corresponding subframe is invalid for transmission. Value 1 in the bitmap indicates that the corresponding subframe is valid for transmission. |
| fdd-UplinkSubframeBitmapBR |
| The set of valid subframes for FDD uplink transmissions for BL UEs, see TS 36.213 [23]. If the field is not present, then UE considers all uplink subframes as valid subframes for FDD uplink transmissions. |
| The first/leftmost bit corresponds to the subframe #0 of the radio frame satisfying SFN mod x = 0, where x is the size of the bit string divided by 10. Value 0 in the bitmap indicates that the corresponding subframe is invalid for transmission. Value 1 in the bitmap indicates that the corresponding subframe is valid for transmission. |
| freqBandIndicatorPriority |
| If the field is present and supported by the UE, the UE shall prioritize the frequency bands in the multiBandInfoList field in decreasing priority order. Only if the UE does not support any of the frequency band in multiBandInfoList, the UE shall use the value in freqBandIndicator field. Otherwise, the UE applies frequency band according to the rules defined in multiBandInfoList. NOTE 2. |
| freqBandInfo |
| A list of additionalPmax and additionalSpectrumEmission values, as defined in TS 36.101 [42], table 6.2.4-1, for UEs neither in CE nor BL UEs and TS 36.101 [42], table 6.2.4E-1, for UEs in CE or BL UEs, for the frequency band in freqBandIndicator. If E-UTRAN includes freqBandInfo-v10l0 it includes the same number of entries, and listed in the same order, as in freqBandInfo-r10. |
| freqHoppingParametersDL |
| Downlink frequency hopping parameters for BR versions of SI messages, MPDCCH/PDSCH of paging, MPDCCH/PDSCH of RAR/Msg4 and unicast MPDCCH/PDSCH. If not present, the UE is not configured downlink frequency hopping. |
| gnss-ID |
| The presence of this field indicates that the posSibType is for a specific Global Navigation Satellite System (GNSS). |
| hsdn-Cell |
| This field indicates this is a HSDN cell as specified in TS 36.304 [4]. |
| hyperSFN |
| Indicates hyper SFN which increments by one when the SFN wraps around. |
| iab-Support |
| This field combines both the support of IAB-node and the cell status for IAB-node. If the field is present, the cell supports IAB-nodes and the cell is also considered as a candidate for cell (re)selection for IAB-nodes; if the field is absent, the cell does not support IAB and/or the cell is barred for IAB-node. |
| ims-EmergencySupport |
| Indicates whether the cell supports IMS emergency bearer services via EPC for UEs in limited service mode. If absent, IMS emergency call via EPC is not supported by the network in the cell for UEs in limited service mode. NOTE 2. |
| ims-EmergencySupport5GC |
| Indicates whether the cell supports IMS emergency bearer services for UEs in limited service mode via 5GC. If absent, IMS emergency call via 5GC is not supported by the network in the cell for UEs in limited service mode. NOTE 2. |
| intraFreqReselection |
| Used to control cell reselection to intra-frequency cells when the highest ranked cell is barred, or treated as barred by the UE, as specified in TS 36.304 [4]. NOTE 2. |
| multiBandInfoList |
| A list of additional frequency band indicators, as defined in TS 36.101 [42], table 5.5-1, that the cell belongs to. If the UE supports the frequency band in the freqBandIndicator field it shall apply that frequency band. Otherwise, the UE shall apply the first listed band which it supports in the multiBandInfoList field. If E-UTRAN includes multiBandInfoList-v9e0 it |

| SystemInformationBlockType1 field descriptions |
|---|
| includes the same number of entries, and listed in the same order, as in multiBandInfoList (i.e. without suffix). See Annex D for more descriptions. The UE shall ignore the rule defined in this field description if freqBandIndicatorPriority is present and supported by the UE. |
| multiBandInfoList-v10j0<br>A list of additionalPmax and additionalSpectrumEmission values, as defined in TS 36.101 [42], table 6.2.4-1, for UEs neither in CE nor BL UEs and TS 36.101 [42], table 6.2.4E-1, for UEs in CE or BL UEs, for the frequency bands in multiBandInfoList (i.e. without suffix) and multiBandInfoList-v9e0. If E-UTRAN includes multiBandInfoList-v10j0, it includes the same number of entries, and listed in the same order, as in multiBandInfoList (i.e. without suffix). If E-UTRAN includes multiBandInfoList-v10l0 it includes the same number of entries, and listed in the same order, as in multiBandInfoList-v10j0. |
| plmn-IdentityList<br>List of PLMN identities. The first listed PLMN-Identity is the primary PLMN. If plmn-IdentityList-v1530 is included, E-UTRAN includes the same number of entries, and listed in the same order, as in plmn-IdentityList (without suffix). If plmn-IdentityList-v1610 is included, E-UTRAN includes the same number of entries, and listed in the same order, as in plmn-IdentityList-r15. NOTE 2. |
| plmn-Index<br>Index of the PLMN in the plmn-IdentityList fields included in SIB1 for EPC, indicating the same PLMN ID is connected to 5GC. Value 1 indicates the 1st PLMN in the 1st plmn-IdentityList included in SIB1, value 2 indicates the 2nd PLMN in the same plmn-IdentityList, or when no more PLMNs are present within the same plmn-IdentityList, then the PLMN listed 1st in the subsequent plmn-IdentityList within the same SIB1 and so on. NOTE 6. |
| p-Max<br>Value applicable for the cell. If absent the UE applies the maximum power according to its capability as specified in TS 36.101 [42], clause 6.2.2. NOTE 2. |
| posSIB-MappingInfo<br>List of the posSIBs mapped to this SystemInformation message. |
| posSibType<br>The positioning SIB type is defined in TS 36.355 [54]. |
| q-QualMin<br>Parameter "$Q_{qualmin}$" in TS 36.304 [4]. If cellSelectionInfo-v920 is not present, the UE applies the (default) value of negative infinity for $Q_{qualmin}$. NOTE 1. |
| q-QualMinRSRQ-OnAllSymbols<br>If this field is present and supported by the UE, the UE shall, when performing RSRQ measurements, perform RSRQ measurement on all Orthogonal Frequency Division Multiplexing (OFDM) symbols in accordance with TS 36.214 [48]. NOTE 1. |
| q-QualMinOffset<br>Parameter "$Q_{qualminoffset}$" in TS 36.304 [4]. Actual value $Q_{qualminoffset}$ = field value [dB]. If cellSelectionInfo-v920 is not present or the field is not present, the UE applies the (default) value of 0 dB for $Q_{qualminoffset}$. Affects the minimum required quality level in the cell. |
| q-QualMinWB<br>If this field is present and supported by the UE, the UE shall, when performing RSRQ measurements, use a wider bandwidth in accordance with TS 36.133 [16]. NOTE 1. |
| q-RxLevMinOffset<br>Parameter $Q_{rxlevminoffset}$ in TS 36.304 [4]. Actual value $Q_{rxlevminoffset}$ = field value * 2 [dB]. If absent, the UE applies the (default) value of 0 dB for $Q_{rxlevminoffset}$. Affects the minimum required Rx level in the cell. |
| sbas-ID<br>The presence of this field indicates that the posSibType is for a specific SBAS. |
| schedulingInfoList<br>Indicates scheduling information of SI messages. The schedulingInfoList-v12j0 (if present) provides additional SIBs mapped into the SI message scheduled via schedulingInfoList (without suffix). If E-UTRAN includes schedulingInfoList-v12j0, it includes the same number of entries, and listed in the same order, as in schedulingInfoList (without suffix). |
| schedulingInfoListExt<br>Indicates scheduling information of additional SI messages. The UE concatenates the entries of schedulingInfoListExt to the entries in schedulingInfoList, according to the general concatenation principles for list extension as defined in 5.1.2. If the schedulingInfoListExt is present, E-UTRAN ensures that the total number of entries of this field plus schedulingInfoList (without suffix) shall not exceed the value of maxSI-Message. |
| sib-MappingInfo<br>List of the SIBs mapped to this SystemInformation message. There is no mapping information of SIB2; it is always present in the first SystemInformation message listed in the schedulingInfoList (without suffix) list. If present, sib-MappingInfo-v12j0 indicates one or more additional SIBs mapped to the concerned SI message listed in the schedulingInfoList (without suffix) list. If schedulingInfoList-v12j0 or schedulingInfoListExt-r12 is present, E-UTRAN does not include any value indicating SIB of type 19 or higher in sib-MappingInfo (without suffix). If schedulingInfoList-v12j0 is present, E-UTRAN ensures that the total number of entries of this field plus sib-MappingInfo (without suffix) shall not exceed the value of maxSIB-1. |
| si-HoppingConfigCommon<br>Frequency hopping activation/deactivation for BR versions of SI messages and MPDCCH/PDSCH of paging. |

-continued

| SystemInformationBlockType1 field descriptions |
|---|
| si-Narrowband<br>This field indicates the index of a narrowband used to broadcast the SI message towards BL UEs and UEs in CE, see TS 36.211 [21], clause 6.4.1 and TS 36.213 [23], clause 7.1.6. Field values (1 . . . maxAvailNarrowBands-r13) correspond to narrowband indices (0 . . . maxAvailNarrowBands-r13-1) as specified in TS 36.211 [21]. |
| si-RepetitionPattern<br>Indicates the radio frames within the SI window used for SI message transmission. Value everyRF corresponds to every radio frame, value every2ndRF corresponds to every 2 radio frames, and so on. The first transmission of the SI message is transmitted from the first radio frame of the SI window. |
| si-Periodicity, posSI-Periodicity<br>Periodicity of the SI-message in radio frames, such that rf8 denotes 8 radio frames, rf16 denotes 16 radio frames, and so on. If the si-posOffset is configured, the posSI-Periodicity of rf8 cannot be used. |
| si-posOffset<br>This field, if present and set to true indicates that the SI messages in PosSchedulingInfoList are scheduled with an offset of 8 radio frames compared to SI messages in SchedulingInfoList. si-posOffset may be present only if the shortest configured SI message periodicity for SI messages in SchedulingInfoList is 80 ms. |
| si-TBS<br>This field indicates the transport block size information used to broadcast the SI message towards BL UEs and UEs in CE, see TS 36.213 [23], Table 7.1.7.2.1-1, for a 6 PRB bandwidth and a QPSK modulation. |
| schedulingInfoList-BR<br>Indicates additional scheduling information of SI messages for BL UEs and UEs in CE. It includes the same number of entries, and listed in the same order, as in schedulingInfoList (without suffix). |
| si-ValidityTime<br>Indicates system information validity timer. If set to TRUE, the timer is set to 3h, otherwise the timer is set to 24 h. |
| si-WindowLength, si-WindowLength-BR<br>Common SI scheduling window for all SIs. Unit in milliseconds, where ms1 denotes 1 millisecond, ms2 denotes 2 milliseconds and so on. In case si-WindowLength-BR-r13 is present and the UE is a BL UE or a UE in CE, the UE shall use si-WindowLength-BR-r13 and ignore the original field si-WindowLength (without suffix). UEs other than BL UEs or UEs in CE shall ignore the extension field si-WindowLength-BR-r13. |
| startSymbolBR<br>For BL UEs and UEs in CE, indicates the OFDM starting symbol for any MPDCCH, PDSCH scheduled on the same cell except the PDSCH carrying SystemInformationBlockType1-BR, see TS 36.213 [23]. Values 1, 2, and 3 are applicable for dl-Bandwidth greater than 10 resource blocks. Values 2, 3, and 4 are applicable otherwise. |
| systemInfoValueTagList<br>Indicates SI message specific value tags for BL UEs and UEs in CE. It includes the same number of entries, and listed in the same order, as in schedulingInfoList (without suffix). |
| systemInfoValueTagSI<br>SI message specific value tag as specified in clause 5.2.1.3. Common for all SIBs within the SI message other than MIB, SIB1, SIB10, SIB11, SIB12 and SIB14. |
| systemInfoValueTag<br>Common for all SIBs other than MIB, MIB-MBMS, SIB1, SIB1-MBMS, SIB10, SIB11, SIB12 and SIB14. Change of MIB, MIB-MBMS, SIB1 and SIB1-MBMS is detected by acquisition of the corresponding message. |
| tdd-Config<br>Specifies the TDD specific physical channel configurations. NOTE 2. |
| trackingAreaCode/trackingAreaCode-5GC<br>A trackingAreaCode that is common for all the PLMNs listed. NOTE2. NOTE 5. |
| transmissionInControlChRegion<br>Indicates, for BL UEs and UEs in CE, LTE control channel region may be used for DL broadcast transmission. NOTE 3. |
| up-CIoT-5GS-Optimisation<br>Indicates whether the UE is allowed to resume the connection with User plane CIoT 5GS optimisation, see TS 24.501 [95]. |

NOTE 1: The value the UE applies for parameter "$Q_{qualmin}$" in TS 36.304 [4] depends on the q-QualMin fields signalled by E-UTRAN and supported by the UE. In case multiple candidate options are available, the UE shall select the highest priority candidate option according to the priority order indicated by the following table (top row is highest priority).

| q-QualMinRSRQ-OnAllSymbols | q-QualMin WB | Value of parameter "$Q_{qualmin}$" in TS 36.304 [4] |
|---|---|---|
| Included | Included | q-QualMinRSRQ-OnAllSymbols − (q-QualMin − q-QualMinWB) |
| Included | Not included | q-QualMinRSRQ-OnAllSymbols |
| Not included | Included | q-QualMinWB |
| Not included | Not included | q-QualMin |

NOTE 2: E-UTRAN sets this field to the same value for all instances of SIB1 message that are broadcasted within the same cell.

NOTE 3: E-UTRAN configures this field only in the BR version of SIB1 message.

NOTE 4: E-UTRAN configures at most 6 EPC PLMNs in total (i.e. across all the PLMN lists except for PLMN lists in cellAccessRelatedInfoList-5GC in SIB1). E-UTRAN configures at most 6 5GC PLMNs in total (i.e. across all the PLMN lists in cellAccessRelatedInfoList-5GC in SIB1).

NOTE 5: E-UTRAN configures only one value for this parameter per PLMN.

NOTE 6: E-UTRAN configures plmn-Index only if the cellBarred is set to notBarred.

| Conditional presence | Explanation |
|---|---|
| BW-reduced | The field is optional present, Need OR, if schedulingInfoSIB1-BR in MIB is set to a value greater than 0. Otherwise the field is not present. |
| FBI-max | The field is mandatory present if freqBandIndicator (i.e. without suffix) is set to maxFBI. Otherwise the field is not present. |
| mFBI | The field is optional present, Need OR, if multiBandInfoList is present. Otherwise the field is not present. |
| mFBI-max | The field is mandatory present if one or more entries in multiBandInfoList (i.e. without suffix, introduced in -v8h0) is set to maxFBI. Otherwise the field is not present. |
| RSRQ | The field is mandatory present if SIB3 is being broadcast and threshServingLowQ is present in SIB3; otherwise optionally present, Need OP. |
| RSRQ2 | The field is mandatory present if q-QualMinRSRQ-OnAllSymbols is present in SIB3; otherwise it is not present and the UE shall delete any existing value for this field. |
| Hopping | The field is mandatory present if si-HoppingConfigCommon field is broadcasted and set to on. Otherwise the field is optionally present, need OP. |
| QrxlevminCE1 | The field is optionally present, Need OR, if q-RxLevMinCE1-r13 is set below −140 dBm. Otherwise the field is not present. |
| TDD | This field is mandatory present for TDD; it is not present for FDD and the UE shall delete any existing value for this field. |
| TDD-OR | The field is optional present for TDD, need OR; it is not present for FDD. |
| WB-RSRQ | The field is optionally present, need OP if the measurement bandwidth indicated by allowedMeasBandwidth in systemInformationBlockType3 is 50 resource blocks or larger; otherwise it is not present. |
| SI-BR | The field is mandatory present if schedulingInfoSIB1-BR is included in MIB with a value greater than 0. Otherwise the field is not present. |

PBCH payload

In NR, the PBCH transmission in the SSB contains the MIB and a set of additional bits (outside the MIB), where these additional bits are denoted PBCH payload. The following is an excerpt from section 7.11 in 3GPP TS 38.212 about PBCH payload generation:

Denote the bits in a transport block delivered to layer 1 by $\bar{a}_0, \bar{a}_1, \bar{a}_2, \bar{a}_3, \ldots, \bar{a}_{\bar{A}-1}$, where $\bar{A}$ is the payload size generated by higher layers. The lowest order information bit $\bar{a}_0$ is mapped to the most significant bit of the transport block as defined in Clause 6.1.1 of [8, TS 38.321].

Generate the following additional timing related PBCH payload bits $\bar{a}_{\bar{A}}, \bar{a}_{\bar{A}+1}, \bar{a}_{\bar{A}+2}, \bar{a}_{\bar{A}+3}, \ldots, \bar{a}_{\bar{A}+7}$, where:

$\bar{a}_{\bar{A}}, \bar{a}_{\bar{A}+1}, \bar{a}_{\bar{A}+2}, \bar{a}_{\bar{A}+3}$ are the $4^{th}$, $3^{rd}$, $2^{nd}$ and $1^{st}$ LSB of SFN, respectively;

$\bar{a}_{\bar{A}+4}$ is the half frame bit $\bar{a}_{HRF}$;

if $\bar{L}_{max}$=10 as defined in Clause 4.1 of [5, TS38.213], $\bar{a}_{\bar{A}+5}$ is the MSB of $k_{SSB}$ as defined in Clause 7.4.3.1 of [4, TS 38.211].

$\bar{a}_{\bar{A}+6}$ is reserved.

$\bar{a}_{\bar{A}+7}$ is the MSB of candidate SS/PBCH block index.

else if $\bar{L}_{max}$=20 as defined in Clause 4.1 of [5, TS38.213], $\bar{a}_{\bar{A}+5}$ is the MSB of $k_{SSB}$ as defined in Clause 7.4.3.1 of [4, TS 38.211].

$\bar{a}_{\bar{A}+6}, \bar{a}_{\bar{A}+7}$ are the $5^{th}$ and $4^{th}$ bits of the candidate SS/PBCH block index, respectively.

else if $\bar{L}_{max}$=64 as defined in Clause 4.1 of [5, TS38.213], $\bar{a}_{\bar{A}+5}, \bar{a}_{\bar{A}+6}, \bar{a}_{\bar{A}+7}$ are the $6^{th}$, $5^{th}$ and $4^{th}$ bits of the candidate SS/PBCH block index, respectively.

else $\bar{a}_{\bar{A}+5}$ is the MSB of $k_{SSB}$ as defined in Clause 7.4.3.1 of [4, TS 38.211].

$\bar{a}_{\bar{A}+6}, \bar{a}_{\bar{A}+7}$ are reserved.

end if

In the above, $\bar{L}_{max}$ represents the maximum number of SSBs (or SSB beams) that may be used in the cell, i.e. the maximum number of SSB transmissions in a half frame. Note that less than $\bar{L}_{max}$ SSBs may be used in the cell. It is also noteworthy that when $\bar{L}_{max}$=10, bit $\bar{a}_{\bar{A}+6}$ is reserved (i.e. unused).

SUMMARY

There currently exist certain challenge(s). For example, a UE performs cell selection/reselection procedures for (re) selecting a cell to camp on, as described above. When a better cell than the current serving (camping) cell or simply a "suitable cell" to camp on is found, based on whether concerned cell's carrier frequency/RAT has precedence over other candidate cells' carrier frequencies/RATs and/or cell's quality exceeds a configured threshold with a higher ranking value or whether cell selection criterion S is fulfilled, the UE is synchronized with the cell's downlink transmissions, ensures that up-to-date system information (that is relevant for UE's operation) for the cell is stored in the UE, monitors the PDCCH for paging transmissions and monitors the channel quality to assess the cell's suitability as a serving cell in relation to other cells to potentially camp on (by performing cell reselection).

When camping on a cell a UE that does not support NTNs may not be able to find out whether the cell is in a non-terrestrial network until relevant system information is acquired. In 3GPP, it has not been agreed whether an explicit or implicit indication is to be introduced so that a UE would know whether the cell is in NTN. In the former case, there can be a flag in MIB, SIB1, SIB2 or any of the other SIBs to provide such indication, whereas in the latter case such indication may be implicitly provided via information broadcasted for NTN-specific information such as ephemeris data.

It would be better if it is possible for a UE to identify whether a cell is suitable to camp on as soon as possible so that the candidate cell is ruled out quickly and the UE can refrain from acquiring whole system information. Considering that parameters associated with S criterion is provided in SIB1, it would be more efficient from UE power consumption and latency standpoint if the UE finds out whether the cell is an NTN cell, for example, once MIB or MIB and SIB1 are acquired.

For a (legacy) UE that does not support NTN but operates on the same frequency with NTN, it will not be possible to acquire the relevant SIB or interpret the information associated with NTN in an acquired SIB. Because there is not any indication that the legacy UE is capable of comprehending to indicate that the cell is an NTN cell, the legacy UE may decide to camp on that cell and, in case random access procedure is triggered, keep on trying to establish a connection with no success, for example, due to invalid tracking area (TA).

Certain aspects of the present disclosure and their embodiments may provide solutions to these or other challenges. For example, certain embodiments propose solutions to prevent a UE that does not support NTN (e.g., a legacy UE) operating on the same frequency with NTN from camping on an NTN cell and therefore trying to establish a connection in such cell with no success, for example, due to invalid TA.

There are, proposed herein, various embodiments which address one or more of the issues disclosed herein.

According to certain embodiments, a method is performed by a wireless device that does not support NTN communication. The method comprises receiving, from a network node, information configured to cause wireless devices that do not support NTN communication to avoid cell selection or re-selection to a candidate cell in an NTN. In response to receiving the information, the method comprises avoiding cell selection or re-selection to the candidate cell in the NTN.

According to certain embodiments, a method is performed by a wireless device that supports NTN communication. The method comprises receiving, from a network node, information configured to cause wireless devices that do not support NTN communication to avoid cell selection or re-selection to a candidate cell in the NTN. The method further comprises determining whether to perform cell selection or re-selection to the candidate cell in the NTN independently of whether the information causes the wireless devices that do not support NTN communication to avoid cell selection or re-selection to the candidate cell.

According to certain embodiments, a method is performed by a network node. The method comprises transmitting information to one or more wireless devices within a coverage area of the network node. The information is configured to cause wireless devices that do not support NTN communication to avoid cell selection or re-selection to a candidate cell in the NTN.

According to certain embodiments, a computer program comprises instructions which when executed on a computer perform any of the steps of any of the above-described methods.

According to certain embodiments, a computer program product comprises a computer program, the computer program comprising instructions which when executed on a computer perform any of the steps of any of the above-described methods.

According to certain embodiments, a non-transitory computer-readable storage medium or carrier comprises a computer program, the computer program comprising instructions which when executed on a computer perform any of the steps of any of the above-described methods.

According to certain embodiments, a wireless device is configured such that the wireless device does not support NTN communication. The wireless device comprises power supply circuitry and processing circuitry. The power supply circuitry is configured to supply power to the wireless device. The processing circuitry is configured to receive, from a network node, information configured to cause wireless devices that do not support NTN communication to avoid cell selection or re-selection to a candidate cell in the NTN. In response to receiving the information, the processing circuitry is further configured to avoid cell selection or re-selection to the candidate cell.

According to certain embodiments, a wireless device is configured to support NTN communication. The wireless device comprises power supply circuitry and processing circuitry. The power supply circuitry is configured to supply power to the wireless device. The processing circuitry is configured to receive, from a network node, information configured to cause wireless devices that do not support NTN communication to avoid cell selection or re-selection to the candidate cell. The processing circuitry is further configured to determine whether to perform cell selection or re-selection to the candidate cell in the NTN independently of whether the information causes the wireless devices that do not support NTN communication to avoid cell selection or re-selection to the candidate cell.

According to certain embodiments, a network node comprises power supply circuitry configured to supply power to the network node and processing circuitry configured to transmit information to one or more wireless devices within a coverage area of the network node. The information is configured to cause wireless devices that do not support NTN communication to avoid cell selection or re-selection to a candidate cell in the NTN.

The above-described methods, wireless devices, network node, computer programs, computer program products, and/or non-transitory computer-readable storage media may include one or more additional features, examples of which are further described in the detailed description below.

Certain embodiments may provide one or more of the following technical advantage(s), both from a UE standpoint and a network standpoint. For the UE, it would be much more efficient from UE power consumption and latency standpoint if the UE finds out whether the cell is not suitable (for example, because the cell is an NTN cell) once certain information is acquired (such as MIB or MIB and SIB1) so that the UE does not camp on that cell and try to establish a connection. For the network, it would be more efficient from the standpoint of network resources because if a legacy UE were to camp on such cell and try to establish a connection with an invalid TA, the uplink transmissions from the legacy UE may interfere with other uplink transmissions from other UEs.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
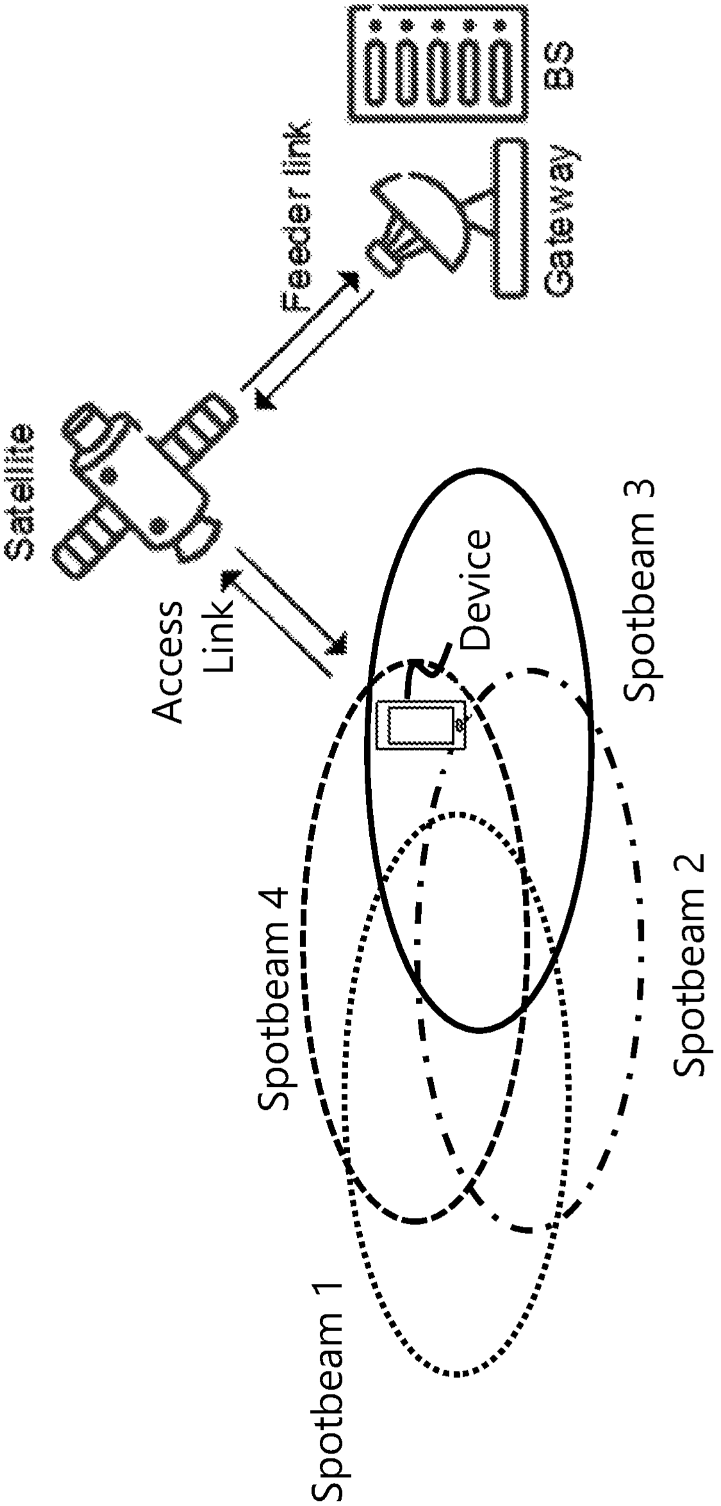
FIG. 1 illustrates an example architecture of a satellite network with bent pipe transponders.
Figure 2:
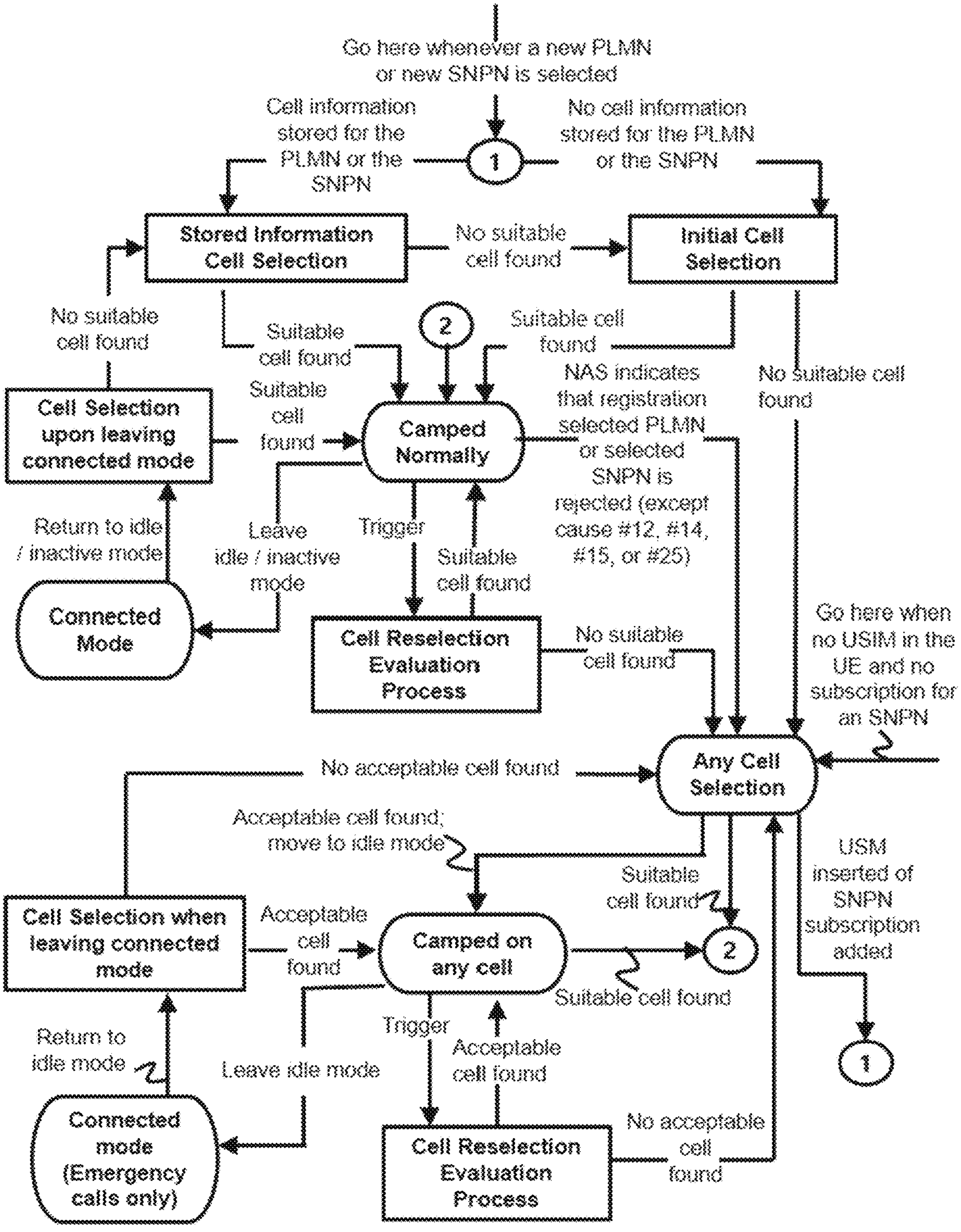
FIG. 2 illustrates an example of RRC_IDLE and RRC_INACTIVE Cell Selection and Reselection.
Figure 3:
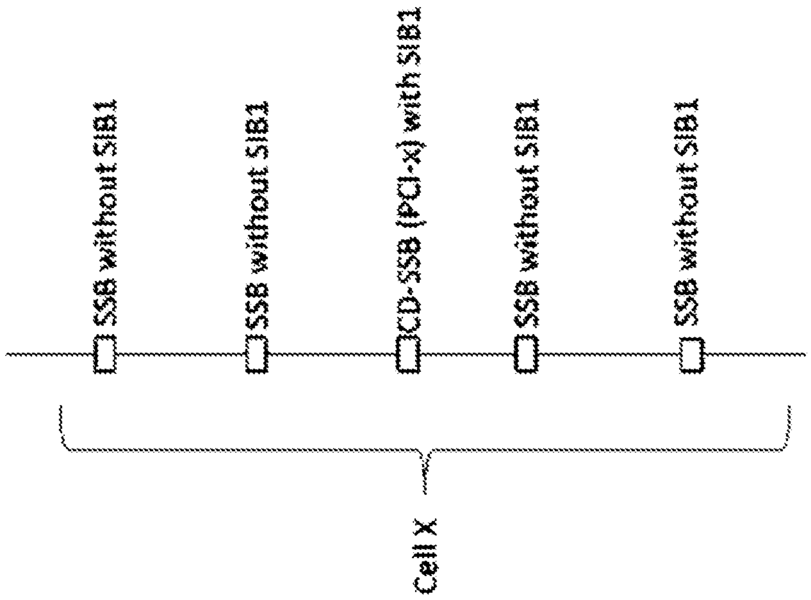
FIG. 3 illustrates an example of SSBs of a cell.
Figure 4:
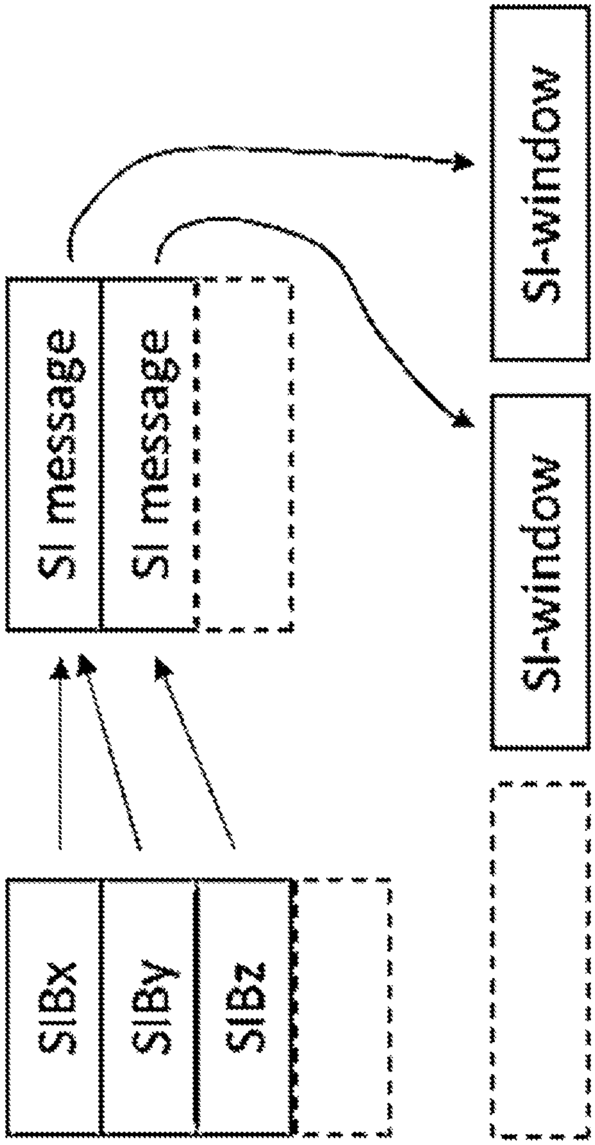
FIG. 4 illustrates an example allocation of SIBs to SI messages and scheduling of SI messages in SI-windows. Each SI message is transmitted in its own SI-window, whose occurrence in time depends on the SI message periodicity and the SI message's position in the list in SIB1.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate.

Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Physical Layer Related Aspects

In one embodiment, a different sync raster for NTN cells is used. This may be indicated by configuring a non-cell-defining SSB on the regular sync raster which would need to be ignored by UEs supporting NTN.

The ssb-SubcarrierOffset parameter in the MIB indicates that the frequency domain offset between SSB and the overall resource block grid in number of subcarriers (note that absence of the field indicates that no offset is applied), or this cell does not provide SIB1 and that there is hence no CORESET #0 configured in MIB. In the latter case, the field parameter pdcch-ConfigSIB1 may indicate the frequency positions where the UE may find SS/PBCH block with SIB1 or the frequency range where the network does not provide SS/PBCH block with SIB1. Therefore, if ssb-SubcarrierOffset indicates no associated SIB1, the UE would search for it at the frequency pointed out by the pdcch-ConfigSIB1 parameter. In one embodiment, the network is configured to indicate that SS/PBCH block with SIB1 is not provided for any frequency range yet a UE that supports NTN searches to find it regardless. One disadvantage of such method would be the wasted UE power consumption in case SIB1 is actually not there, i.e., not even for UEs that support NTN.

For example, a UE that supports NTN, would ignore the pointer to another cell defining SSB, but for a UE that supports NTN if such UE does not find the cell defining SSB (CD-SSB), it would assume that the pointer to another CD-SSB was actually valid and then the UE that supports NTN would follow that pointer. If it is a terrestrial network, and the pointer to another CD-SSB is valid, then the UE that supports NTN would end up with the same eventual result, i.e., synchronizing with the CD-SSB and reading its associated SIB1. This will take a bit longer since the UE that supports NTN will waste time and energy on trying to find a non-existing CD-SSB.

Embodiments Using Currently Non-Used Values in MIB for NR NTN

In one embodiment, in NTN system in FR2 (or FR1), the Subcarrieroffset={12, 13, 14, 15} (or {24, . . . , 31} in FR1) is used to indicate where the CD-SSB is. For example, if this SSB is a CD-SSB, one of the values may be used to indicate subcarrier offset value 0 which means that this SSB is a CD-SSB for NTN. Additionally, the other values may be used for other subcarrier offset values for NTN usage.

The difference for FR2 and FR1 is because in FR1 the ssb-SubCarrierOffset is extended with one additional bit transmitted on the PBCH but outside of the MIB which means that value range is 0 to 32. This is explained in the background but repeated here for convenience.

Advantage of this embodiment is that the TN network may use the same sync raster as the NTN network. A Release 16 UE, or Release 17 UE that intents to access a TN network, assumes that only values 11 and smaller are used to point out a location for CD-SSB.

Embodiments Using Currently Non-Used Values in MIB for LTE-M and NB-IoT

In one embodiment the schedulingInfoSIB1-BR is always set 0 for NB-IoT NTN network and the spare=BIT STRING (SIZE (4)) is used to give the scheduling of SIB1-BR.

The values for the spare need to be redefined for IoT NTN.

Higher Layers Related Aspects

One embodiment includes the "cellBarred" parameter below for NR:

```
MIB ::=                      SEQUENCE {
  systemFrameNumber                  BIT STRING (SIZE (6)),
  subCarrierSpacingCommon             ENUMERATED {scs15or60, scs30or120},
  ssb-SubcarrierOffset              INTEGER (0..15),
  dmrs-TypeA-Position                 ENUMERATED {pos2, pos3},
  pdcch-ConfigSIB1                   PDCCH-ConfigSIB1,
  cellBarred                 ENUMERATED {barred, notBarred},
  intraFreqReselection              ENUMERATED {allowed, notAllowed},
  spare                      BIT STRING (SIZE (1))
}
-- TAG-MIB-STOP
-- ASN1STOP
```

where the value of cellBarred indicates whether the cell is barred, is used to indicate that legacy UEs, i.e., UEs that do not support NTN, shall not camp on this cell, yet a UE that supports the feature ignores such indication. In that case, the field parameter cellBarred is not applicable to NTN cells. Or, in a variant, the spare bit is used to indicate cell barring for NTN network.

In a dependent embodiment, a flag that indicates that the cell is barred is introduced for UEs that support NTN to compensate the indication that would be missing for the barred cell, i.e., whether the NTN cell is barred. The indication may be introduced using the spare bit in MIB but considering that there is only one spare bit left in the MIB, the flag can also be introduced in SIB1 or SIB2. Another option is to use a reserved (i.e. currently unused) bit in the PBCH payload as the flag, e.g. bit $\bar{a}_{\bar{A}+6}$ which is reserved when the maximum number of SSBs that may be used in the cell is 10 (this is discussed above under the heading "PBCH payload").

One embodiment (same in principle for the first embodiment in this section above for NR) provides the "cellBarred" parameter below for E-UTRAN:

```
SystemInformationBlockType1 ::=   SEQUENCE {
  cellAccessRelatedInfo           SEQUENCE {
    plmn-IdentityList               PLMN-IdentityList,
    trackingAreaCode                TrackingAreaCode,
    cellIdentity                  CellIdentity,
    cellBarred                      ENUMERATED {barred, notBarred},
    intraFreqReselection            ENUMERATED {allowed, notAllowed},
    csg-Indication                  BOOLEAN,
    csg-Identity                  CSG-Identity       OPTIONAL   -- Need OR
  },
  cellSelectionInfo               SEQUENCE {
    q-RxLevMin                        Q-RxLevMin,
    q-RxLevMinOffset                INTEGER (1..8)       OPTIONAL   --
Need OP
  },
  p-Max                           P-Max                OPTIONAL,    --
Need OP
  freqBandIndicator               FreqBandIndicator,
  schedulingInfoList              SchedulingInfoList,
  tdd-Config                      TDD-Config           OPTIONAL,    --
Cond TDD
  si-WindowLength                   ENUMERATED {
                                    ms1, ms2, ms5, ms10, ms15, ms20,
                                    ms40},
  systemInfoValueTag                INTEGER (0..31),
   nonCriticalExtension           SystemInformationBlockType1-v890-IEs
  OPTIONAL
}
...
```

where the value of cellBarred indicates whether the cell is barred, is used to indicate that legacy UEs, i.e., UEs that do not support NTN, shall not camp on this cell, yet a UE that supports the feature ignores such indication. In that case, the field parameter cellBarred is not applicable to NTN cells. Or, in a variant, another field or new parameter is used for cell barring for NTN UEs.

In a dependent embodiment, a flag that indicates that the cell is barred is introduced for UEs that support NTN to compensate the indication that would be missing for the barred cell. i.e., whether the NTN cell is barred. The indication may be introduced using a spare bit in MIB or in SIB1 or SIB2.

Certain embodiments of the present disclosure may be implemented in a network node. Examples of network nodes include a gNB (a base station in NR), an eNB (Evolved NodeB, a base station in LTE), and a communication satellite. Certain embodiments may be implemented in a wireless device. Certain embodiments may be implemented in the context of a 3GPP Non-Terrestrial Network, release 17+. Certain embodiments relate, in general, to the technical areas of satellite communication, NR, LTE, E-UTRAN, cell selection, cell reselection, Non-Terrestrial Networks, camping, and/or system information broadcast.

Figure 5:
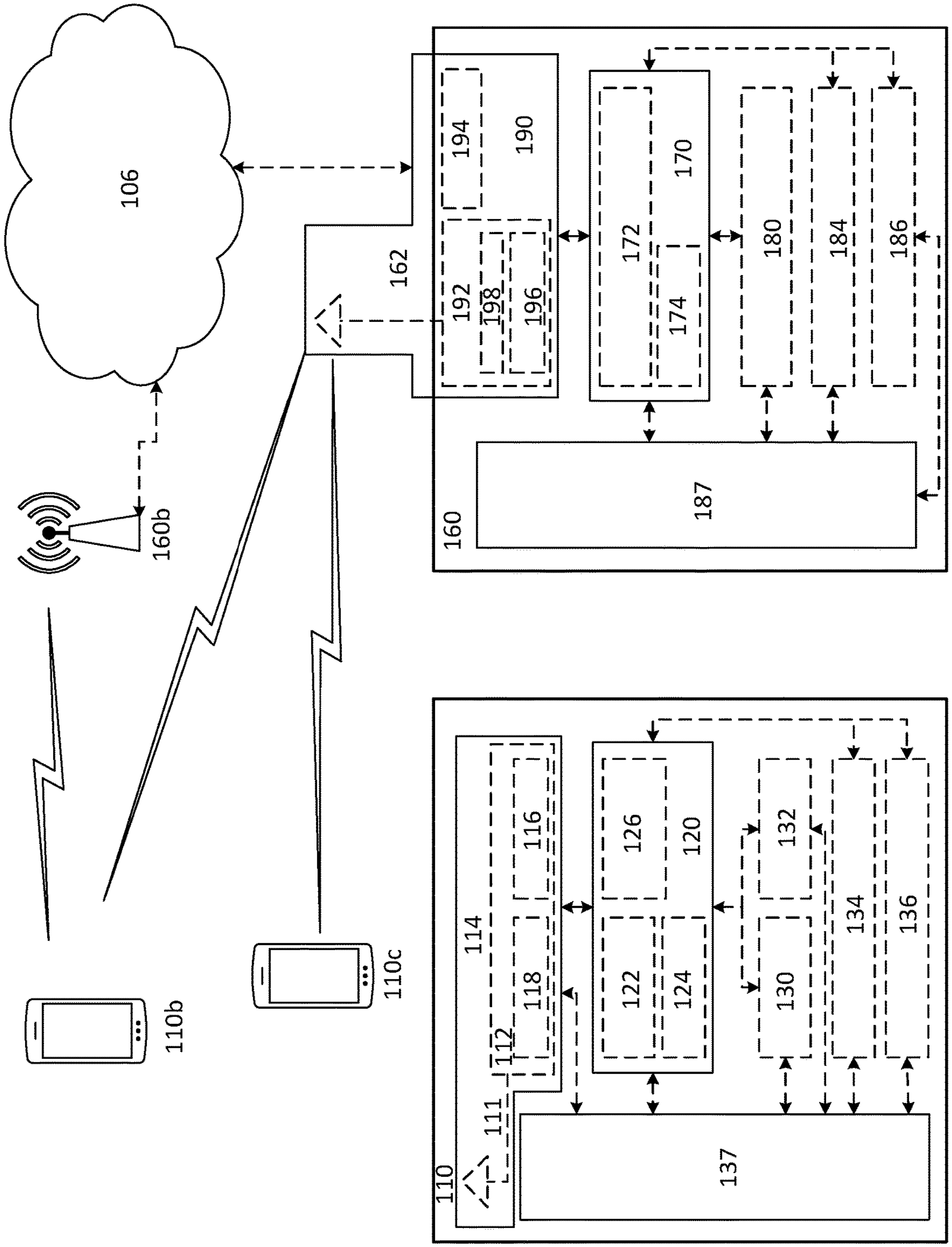
FIG. 5 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., Mobile Switching Centers (MSCs), Mobility Management Entities (MMEs)), Operation and Maintenance (O&M) nodes, Operations Support System (OSS) nodes, Self Optimized Network (SON) nodes, positioning nodes (e.g., Evolved-Serving Mobile Location Centres, E-SMLCs), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, network node 160 includes processing circuitry 170, device readable medium 180, interface 190, auxiliary equipment 184, power source 186, power circuitry 187, and antenna 162. Although network node 160 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, Wide Code Division Multiplexing Access (WCDMA), LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 5 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 6:
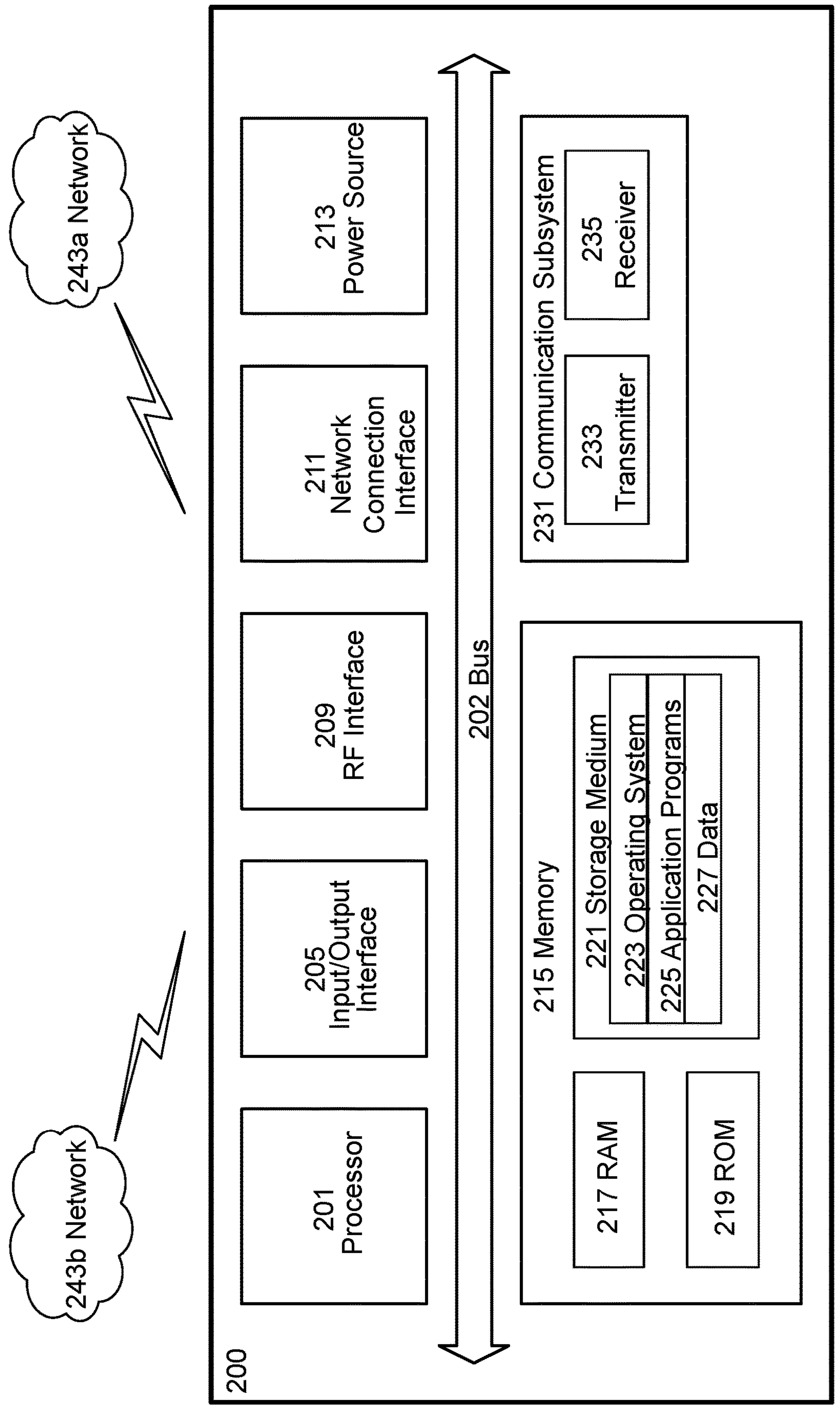
FIG. 6 illustrates User Equipment in accordance with some embodiments.

FIG. 6 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the 3$^{rd}$ Generation Partnership Project (3GPP), including a NB-IoT UE, a machine type communication (MTC) UE, and/or an enhanced MTC (eMTC) UE. UE 200, as illustrated in FIG.

6, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 6 is a UE, the components discussed herein are equally applicable to a WD, and vice-versa.

In FIG. 6, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may utilize all of the components shown in FIG. 6, or only a subset of the components. The level of integration between the components may vary from one UE to another UE. Further, certain UEs may contain multiple instances of a component, such as multiple processors, memories, transceivers, transmitters, receivers, etc.

In FIG. 6, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 6, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 7:
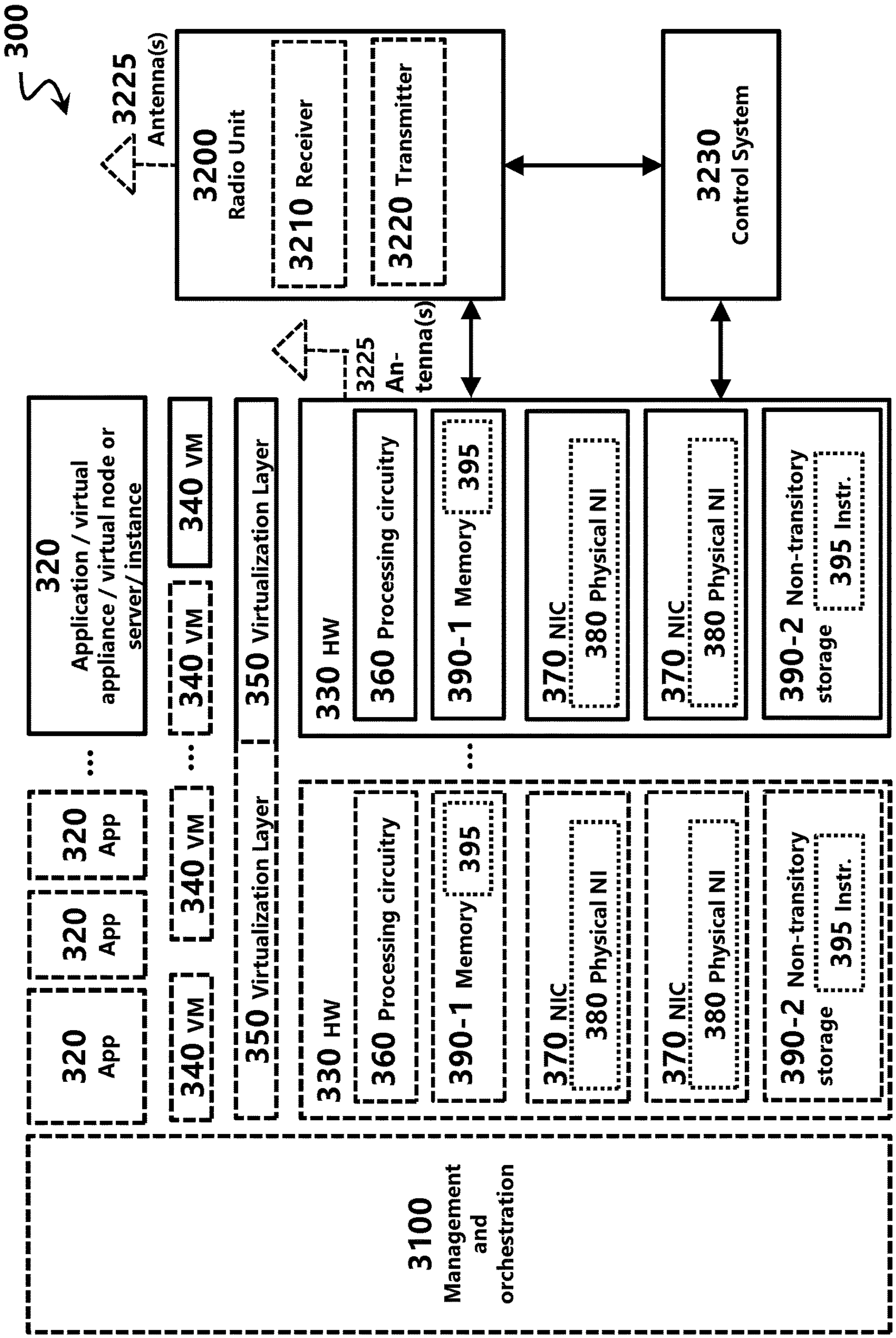
FIG. 7 illustrates a virtualization environment in accordance with some embodiments.

FIG. 7 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 7, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 7.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 8:
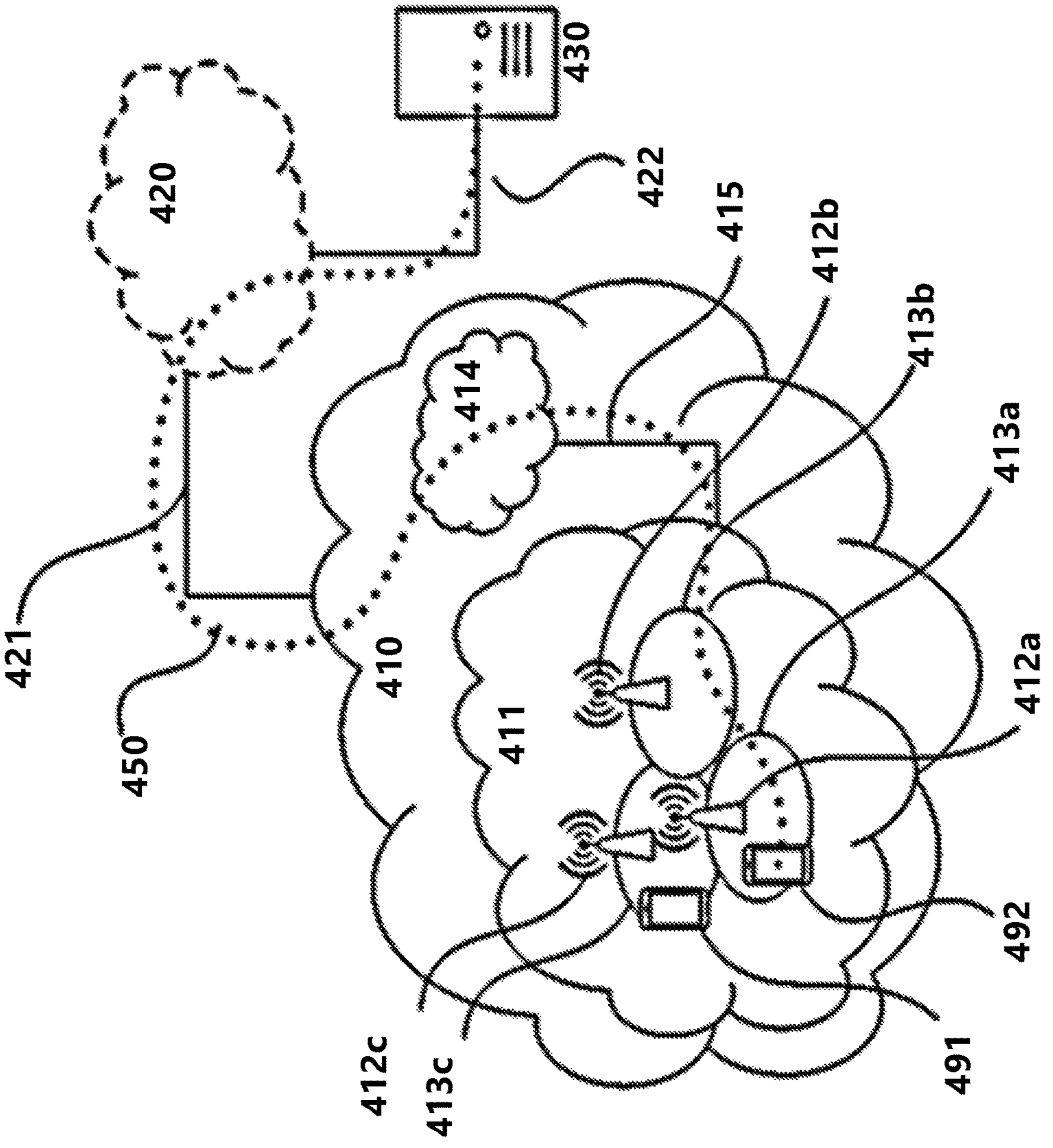
FIG. 8 illustrates a telecommunication network connected via an intermediate network to a host computer in accordance with some embodiments.

With reference to FIG. 8, in accordance with an embodiment, a communication system includes telecommunication network 410, such as a 3GPP-type cellular network, which comprises access network 411, such as a radio access network, and core network 414. Access network 411 comprises a plurality of base stations 412*a*, 412*b*, 412*c*, such as NBs, eNBs, gNBs or other types of wireless access points, each defining a corresponding coverage area 413*a*, 413*b*, 413*c*. Each base station 412*a*, 412*b*, 412*c* is connectable to core network 414 over a wired or wireless connection 415. A first UE 491 located in coverage area 413*c* is configured to wirelessly connect to, or be paged by, the corresponding base station 412*c*. A second UE 492 in coverage area 413*a* is wirelessly connectable to the corresponding base station 412*a*. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 8 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 9. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 9) served by base station 520. Communication interface 526 may be configured to facilitate connection 560 to host computer 510. Connection 560 may be direct or it may pass through a core network (not shown in FIG. 9) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 9:
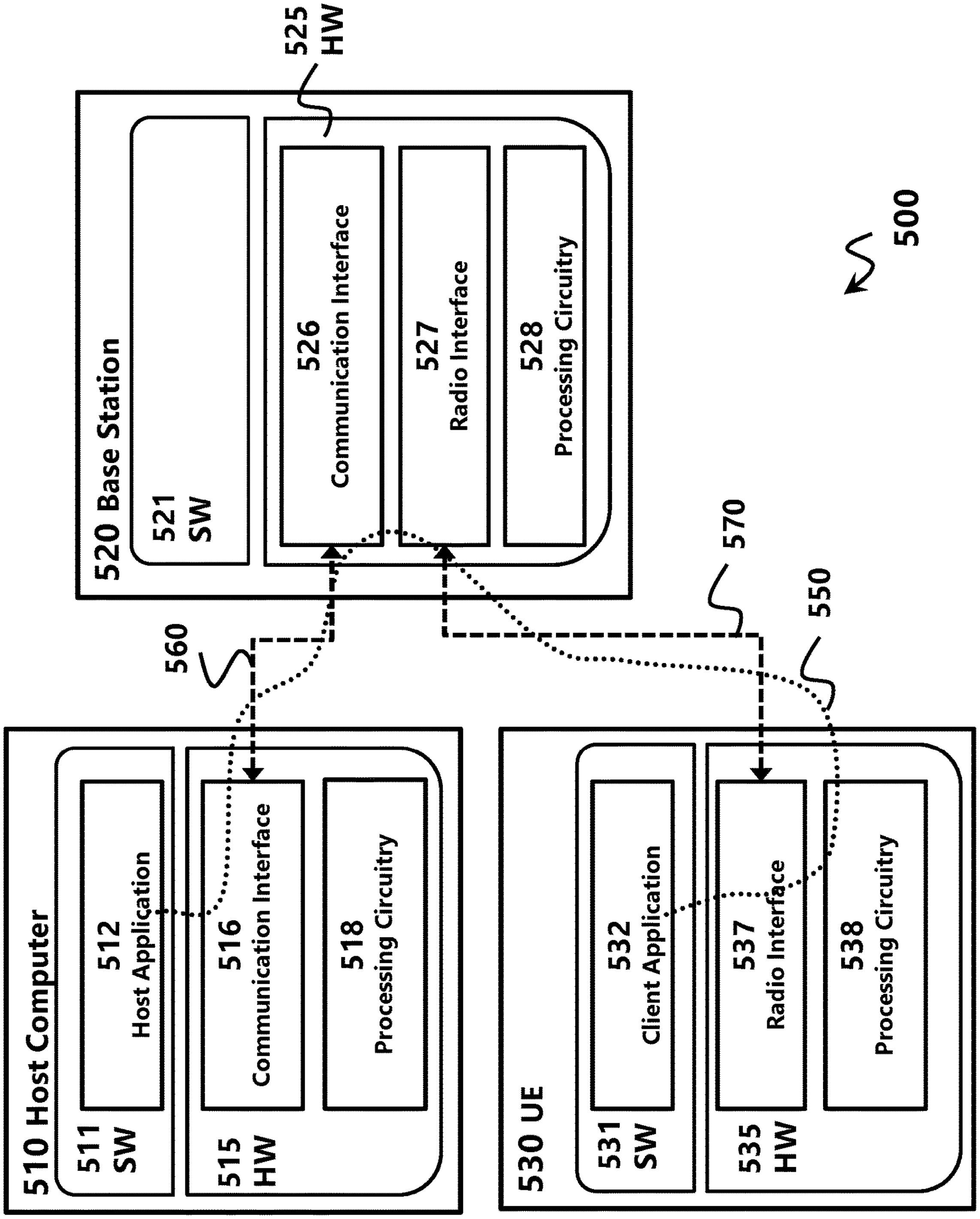
FIG. 9 illustrates a host computer communicating via a base station with a user equipment over a partially wireless connection in accordance with some embodiments.

It is noted that host computer 510, base station 520 and UE 530 illustrated in FIG. 9 may be similar or identical to host computer 430, one of base stations 412*a*, 412*b*, 412*c* and one of UEs 491, 492 of FIG. 8, respectively. This is to say, the inner workings of these entities may be as shown in FIG. 9 and independently, the surrounding network topology may be that of FIG. 8.

In FIG. 9, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve latency and/or power consumption and thereby provide benefits such as reduced user waiting time and/or extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 10:
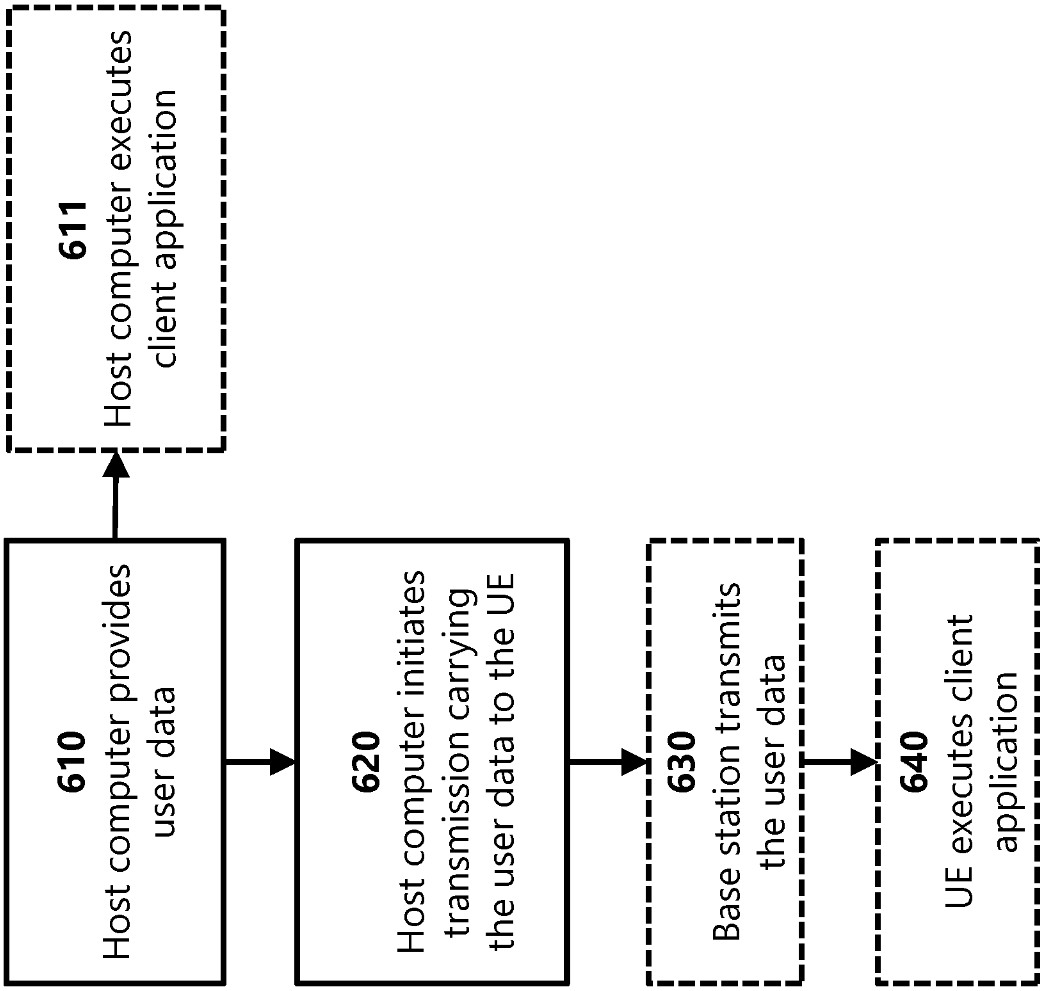
FIG. 10 illustrates methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 11:
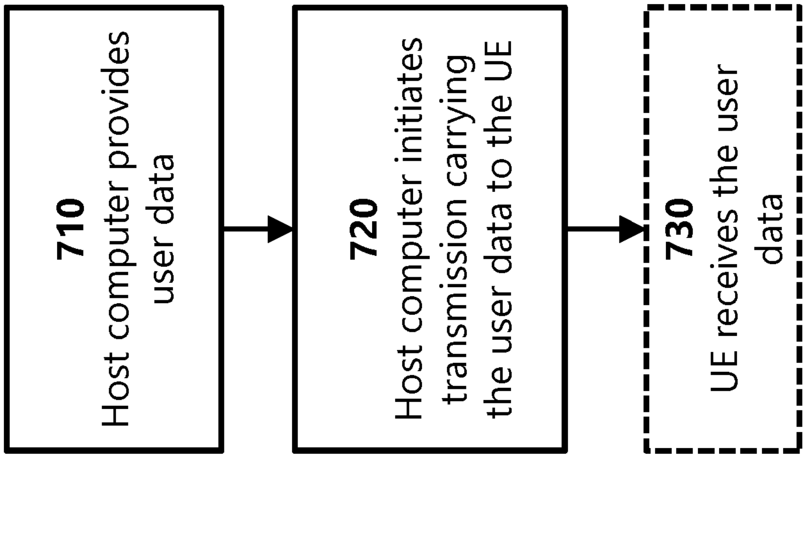
FIG. 11 illustrates methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 12:
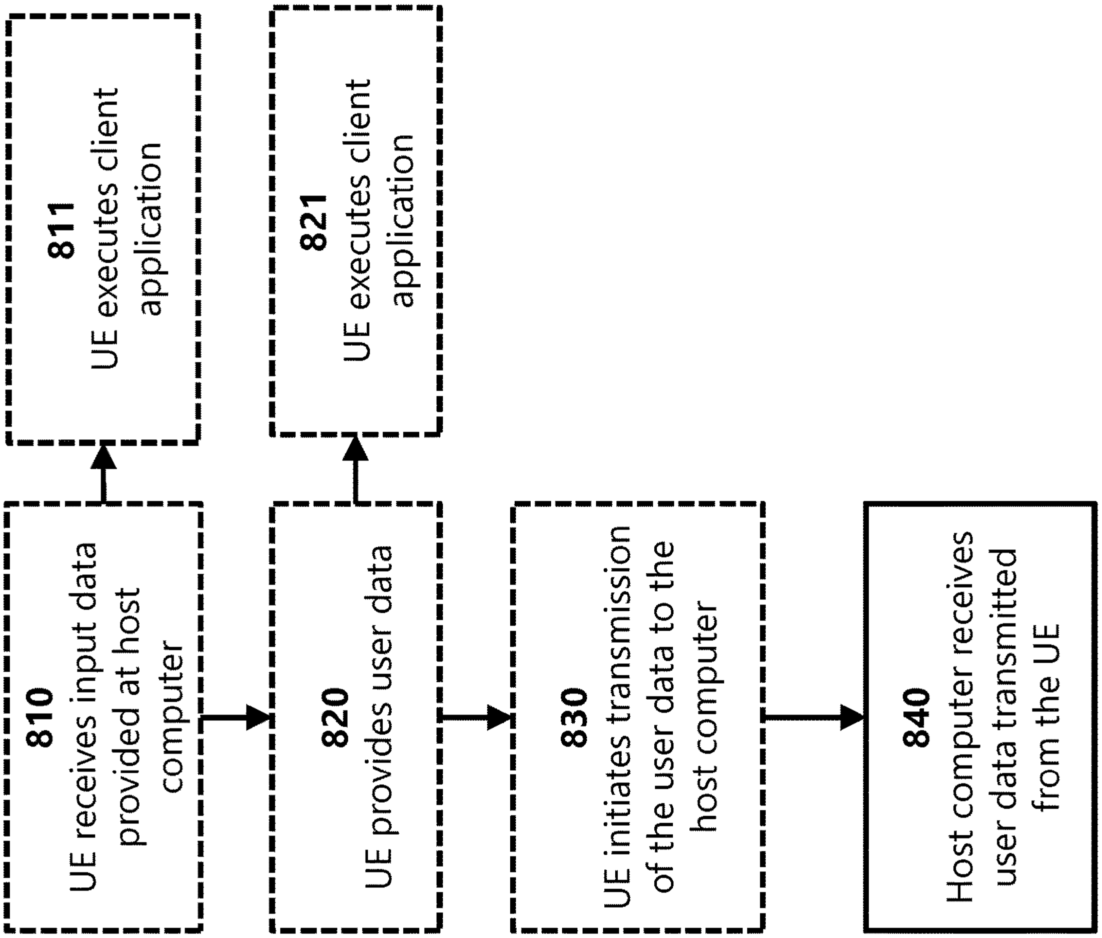
FIG. 12 illustrates methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 13:
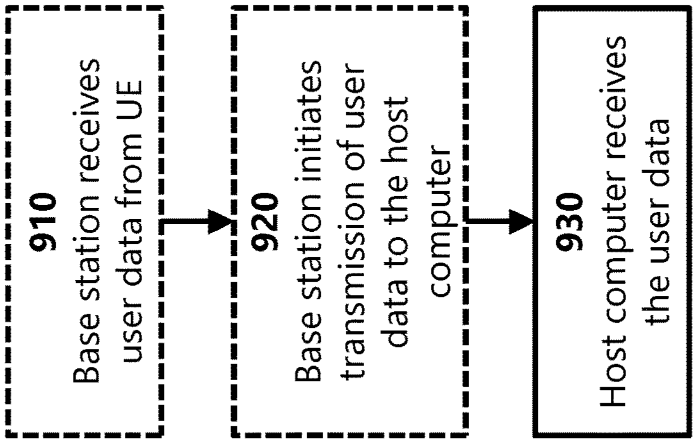
FIG. 13 illustrates methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 14:
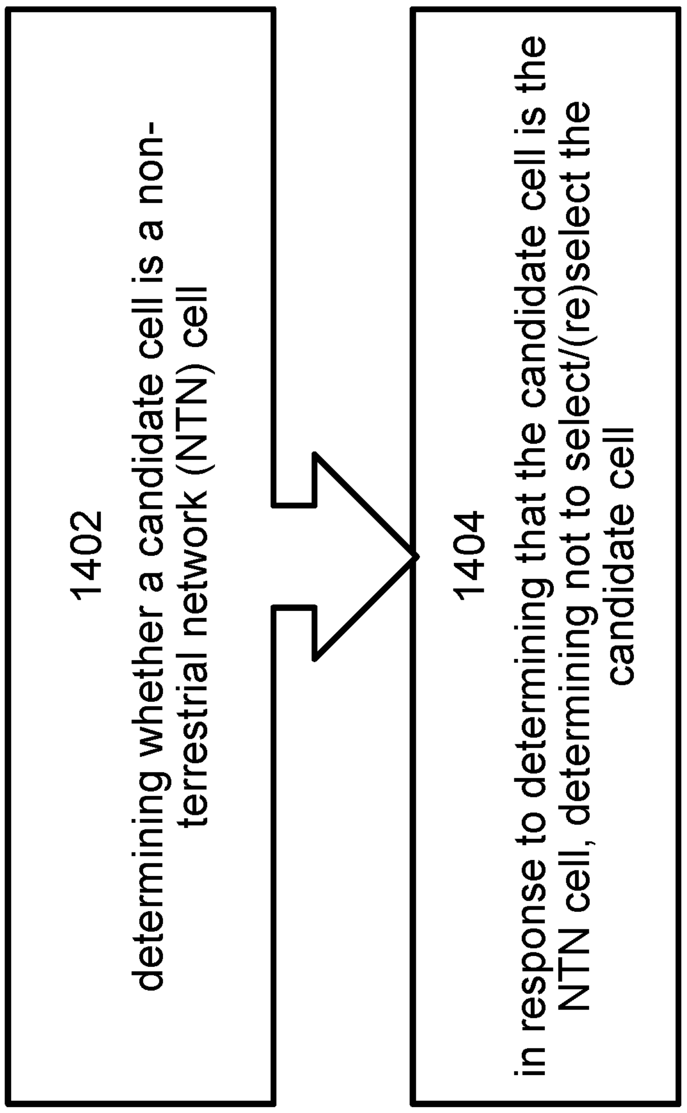
FIG. 14 illustrates a method in accordance with some embodiments.

FIG. 14 depicts a method in accordance with particular embodiments. The method may be performed by a wireless device, such as wireless device 110 or UE 200 described above. In certain embodiments, the wireless device does not support NTN (e.g., the wireless device is a legacy device). The method begins at step 1402 with determining whether a candidate cell is a non-terrestrial network (NTN) cell. The method proceeds to step 1404 with, in response to determining that the candidate cell is the NTN cell, determining not to select/(re)select the candidate cell.

Figure 15:
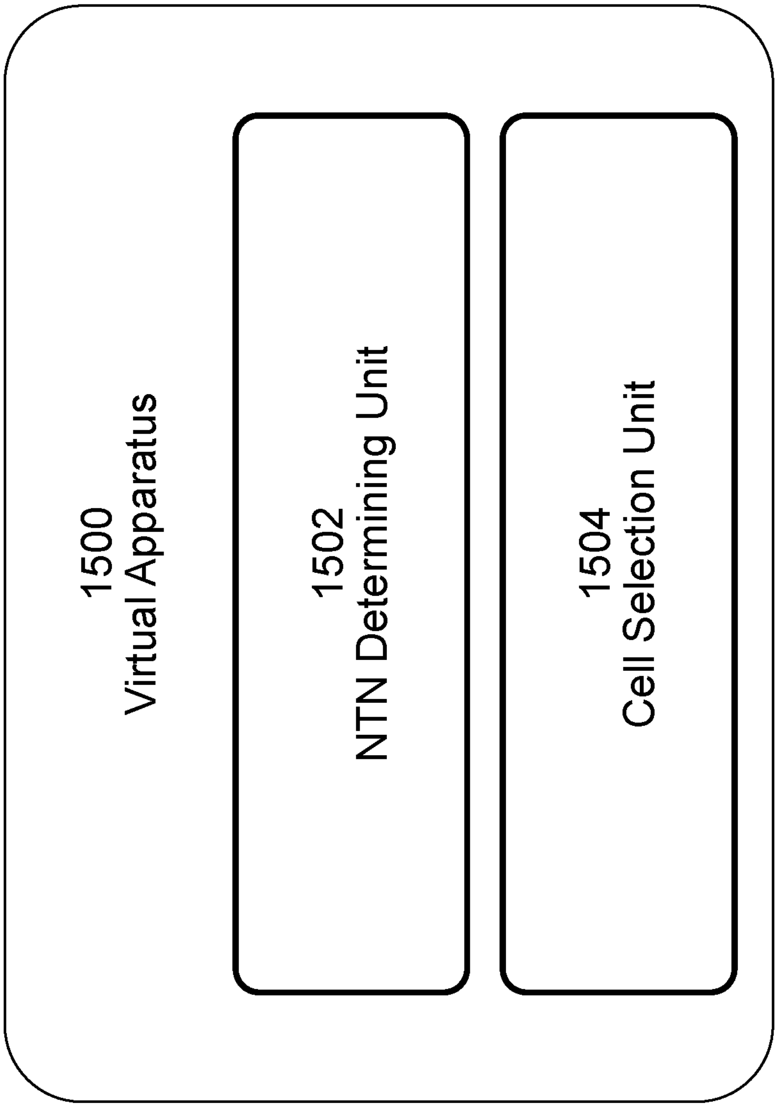
FIG. 15 illustrates a virtualization apparatus in accordance with some embodiments.

FIG. 15 illustrates a schematic block diagram of an apparatus 1500 in a wireless network (for example, the wireless network shown in FIG. 5). The apparatus may be implemented in a wireless device (e.g., wireless device 110 or UE 200). In certain embodiments, the wireless device does not support NTN (e.g., the wireless device is a legacy device). Apparatus 1500 is operable to carry out the example method described with reference to FIG. 14 and possibly any other processes or methods disclosed herein. It is also to be understood that the method of FIG. 14 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause NTN determining unit 1502, cell selection unit 1504, and any other suitable units of apparatus 1500 to perform corresponding functions according one or more embodiments of the present disclosure.

As illustrated in FIG. 15, apparatus 1500 includes NTN determining unit 1502 and cell selection unit 1504. In general, NTN determining unit 1502 determines whether a candidate cell is a non-terrestrial network (NTN) cell. For example, in certain embodiments, determines whether the candidate cell is the NTN cell once the wireless device has acquired a Master Information Block (MIB) associated with the candidate cell or once the wireless device has acquired both a Master Information Block (MIB) and a System Information Block 1 (SIB1) associated with the candidate cell (without having to acquire whole system information associated with the candidate cell). NTN determining unit 1502 indicates to cell selection unit 1504 whether the candidate cell is an NTN cell. Cell selection unit 1504 may select/(re)select the candidate cell if the candidate cell is not an NTN cell. Cell selection unit 1504 may select/(re)select a different cell if the candidate cell is an NTN cell.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

EMBODIMENTS

Group A Embodiments

1. A method performed by a wireless device, the method comprising:
   determining whether a candidate cell is a non-terrestrial network (NTN) cell; and
   in response to determining that the candidate cell is the NTN cell, determining not to select/(re)select the candidate cell.
2. The method of embodiment 1, further comprising refraining from acquiring whole system information associated with the candidate cell.
3. The method of embodiment 1 or 2, wherein determining whether the candidate cell is the NTN cell occurs once the wireless device has acquired a Master Information Block (MIB) associated with the candidate cell.
4. The method of embodiment 1 or 2, wherein determining whether the candidate cell is the NTN cell occurs once the wireless device has acquired a Master Information Block (MIB) and a System Information Block 1 (SIB1) associated with the candidate cell.

5. The method of any of embodiments 1-4, wherein determining whether the candidate cell is the NTN cell is based at least in part on information received from the candidate cell.

6. The method of embodiment 5, wherein the information received form the candidate cell comprises a pointer to another cell.

7. The method of any of embodiments 5-6, wherein the information received from the candidate cell comprises physical layer information.

8. The method of any of embodiments 5-7, wherein the information received from the candidate cell comprises a MIB indicating whether the candidate cell is the NTN cell.

9. The method of any of embodiments 5-8, wherein the information received from the candidate cell comprises a SIB1 indicating whether the candidate cell is the NTN cell.

10. The method of any of embodiments 5-9, wherein the information received from the candidate cell comprises a higher layer indication of whether the candidate cell is barred to wireless devices that do not support the NTN.

11. The method of any of embodiments 1-10, wherein determining whether the candidate cell is the NTN cell is based at least in part on information received from another cell.

12. The method of any of embodiments 1-11, further comprising selecting/(re)selecting a different candidate cell, wherein the different candidate cell is not an NTN cell.

13. The method of embodiment 12, further comprising establishing an RRC connection with the different candidate cell.

14. The method of any of the previous embodiments, further comprising:
providing user data; and
forwarding the user data to a host computer via the transmission to the base station.

Group B Embodiments

15. A method performed by a base station, the method comprising:
transmitting information indicating whether a cell is a non-terrestrial network (NTN) cell.

16. The method of embodiment 15, further comprising:
determining the information to transmit in order to indicate that the base station is the NTN cell.

17. The method any of embodiments 15-16, wherein the information comprises a pointer to another cell.

18. The method of any of embodiments 15-17, wherein the information comprises physical layer information.

19. The method of any of embodiments 15-18, wherein the information comprises a MIB indicating whether the cell is the NTN cell.

20. The method of any of embodiments 15-19, wherein the information comprises a SIB1 indicating whether the cell is the NTN cell.

21. The method of any of embodiments 15-20, wherein the information comprises a higher layer indication of whether the cell is barred to wireless devices that do not support the NTN.

22. The method of any of the previous embodiments, further comprising:
obtaining user data; and
forwarding the user data to a host computer or a wireless device.

Group C Embodiments

23. A wireless device, the wireless device comprising:
processing circuitry configured to perform any of the steps of any of the Group A embodiments; and
power supply circuitry configured to supply power to the wireless device.

24. A base station, the base station comprising:
processing circuitry configured to perform any of the steps of any of the Group B embodiments;
power supply circuitry configured to supply power to the base station.

25. A user equipment (UE), the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

26. A computer program, the computer program comprising instructions which when executed on a computer perform any of the steps of any of the Group A embodiments.

27. A computer program product comprising a computer program, the computer program comprising instructions which when executed on a computer perform any of the steps of any of the Group A embodiments.

28. A non-transitory computer-readable storage medium or carrier comprising a computer program, the computer program comprising instructions which when executed on a computer perform any of the steps of any of the Group A embodiments.

29. A computer program, the computer program comprising instructions which when executed on a computer perform any of the steps of any of the Group B embodiments.

30. A computer program product comprising a computer program, the computer program comprising instructions which when executed on a computer perform any of the steps of any of the Group B embodiments.

31. A non-transitory computer-readable storage medium or carrier comprising a computer program, the computer program comprising instructions which when executed on a computer perform any of the steps of any of the Group B embodiments.

32. A communication system including a host computer comprising:
processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

33. The communication system of the pervious embodiment further including the base station.

34. The communication system of the previous 2 embodiments, further including the UE, wherein the UE is configured to communicate with the base station.

35. The communication system of the previous 3 embodiments, wherein:

the processing circuitry of the host computer is configured to execute a host application, thereby providing the user data; and the UE comprises processing circuitry configured to execute a client application associated with the host application.

36. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the Group B embodiments.

37. The method of the previous embodiment, further comprising, at the base station, transmitting the user data.

38. The method of the previous 2 embodiments, wherein the user data is provided at the host computer by executing a host application, the method further comprising, at the UE, executing a client application associated with the host application.

39. A user equipment (UE) configured to communicate with a base station, the UE comprising a radio interface and processing circuitry configured to performs the of the previous 3 embodiments.

40. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

41. The communication system of the previous embodiment, wherein the cellular network further includes a base station configured to communicate with the UE.

42. The communication system of the previous 2 embodiments, wherein:

the processing circuitry of the host computer is configured to execute a host application, thereby providing the user data; and the UE's processing circuitry is configured to execute a client application associated with the host application.

43. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the Group A embodiments.

44. The method of the previous embodiment, further comprising at the UE, receiving the user data from the base station.

45. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the Group A embodiments.

46. The communication system of the previous embodiment, further including the UE.

47. The communication system of the previous 2 embodiments, further including the base station, wherein the base station comprises a radio interface configured to communicate with the UE and a communication interface configured to forward to the host computer the user data carried by a transmission from the UE to the base station.

48. The communication system of the previous 3 embodiments, wherein:

the processing circuitry of the host computer is configured to execute a host application; and the UE's processing circuitry is configured to execute a client application associated with the host application, thereby providing the user data.

49. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

50. A method implemented in a communication system including a host computer, a base station and a user equipment (UE), the method comprising:

at the host computer, receiving user data transmitted to the base station from the UE, wherein the UE performs any of the steps of any of the Group A embodiments.

51. The method of the previous embodiment, further comprising, at the UE, providing the user data to the base station.

52. The method of the previous 2 embodiments, further comprising:

at the UE, executing a client application, thereby providing the user data to be transmitted; and at the host computer, executing a host application associated with the client application.

53. The method of the previous 3 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

54. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

55. The communication system of the previous embodiment further including the base station.

56. The communication system of the previous 2 embodiments, further including the UE, wherein the UE is configured to communicate with the base station.

57. The communication system of the previous 3 embodiments, wherein:

the processing circuitry of the host computer is configured to execute a host application;

the UE is configured to execute a client application associated with the host application, thereby providing the user data to be received by the host computer.

58. A method implemented in a communication system including a host computer, a base station and a user equipment (UE), the method comprising:

at the host computer, receiving, from the base station, user data originating from a transmission which the base station has received from the UE, wherein the UE performs any of the steps of any of the Group A embodiments.

59. The method of the previous embodiment, further comprising at the base station, receiving the user data from the UE.

60. The method of the previous 2 embodiments, further comprising at the base station, initiating a transmission of the received user data to the host computer.

Figure 16:
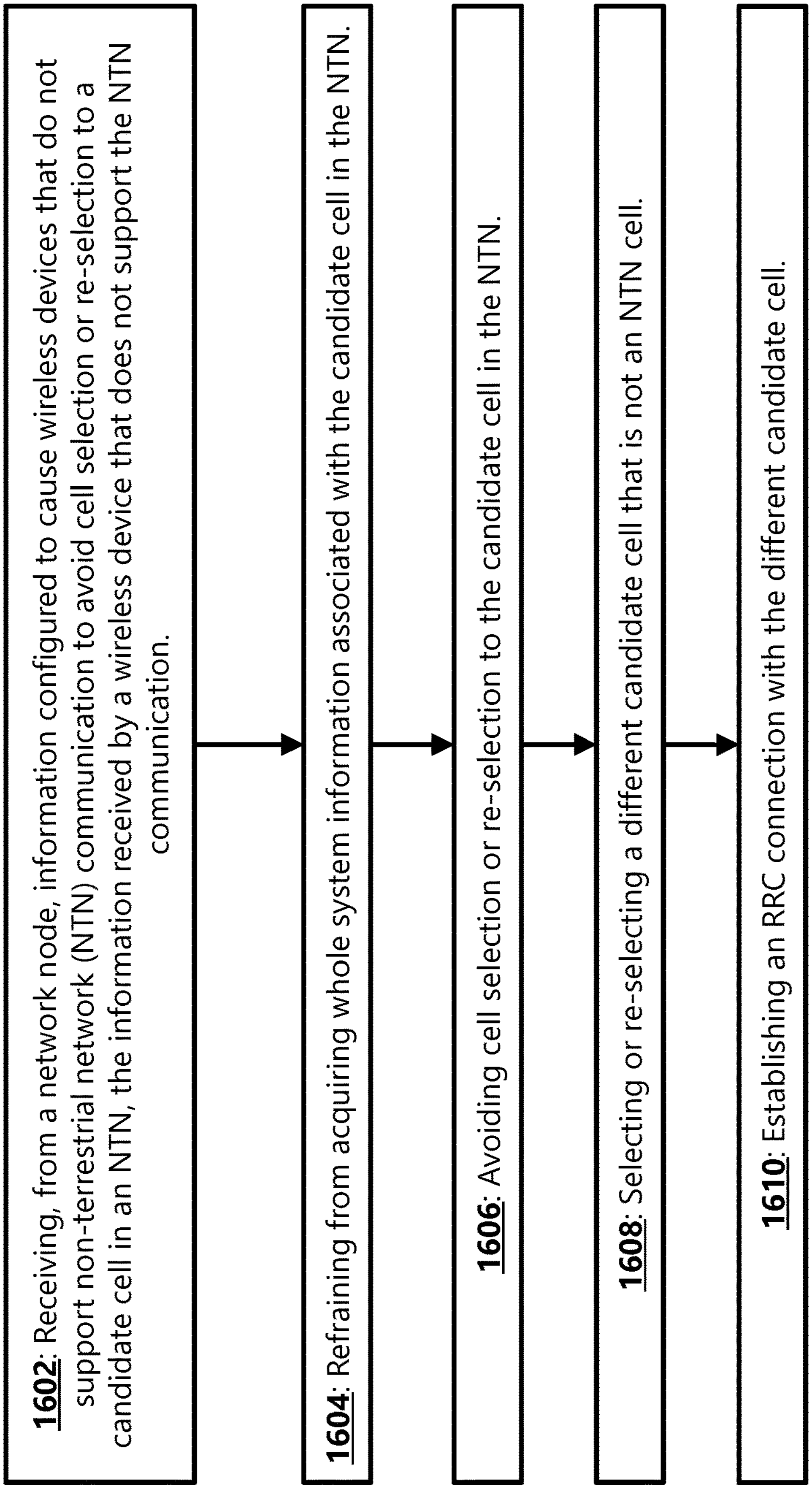
FIG. 16 illustrates an example of a method performed by a wireless device that does not support NTN communication, such as a legacy UE, in accordance with certain embodiments.

FIG. 16 illustrates an example of a method performed by a wireless device that does not support NTN communication, such as a legacy UE, in accordance with certain embodiments. In an embodiment, the method of FIG. 16 may be performed by a wireless device 110. For example, wireless device 110 may comprise processing circuitry 120 configured to perform the steps of the method. In an embodiment, the processing circuitry 120 may execute instructions of a computer program that cause the wireless device to perform the method.

In certain embodiments, the method begins at step 1602 with receiving information from a network node. The information is configured to cause wireless devices that do not support NTN communication to avoid cell selection or re-selection to a candidate cell in an NTN. In certain embodiments, the information may be received from a network node in an NTN, such as a BS similar to that illustrated in FIG. 1, which communicates with wireless devices via satellite. As an example, the information may be received from a network node that includes the candidate cell. The information may be received via broadcast signaling from the network node.

As an example, in certain embodiments, the information received in step 1602 indicates a frequency position where a terrestrial network does or does not provide a synchronization signal block. This may cause the wireless device to detect a candidate cell in the terrestrial network based on the frequency position (e.g., instead of selecting or re-selecting the candidate cell in the NTN). Detecting a candidate cell in the terrestrial network based on the frequency position may involve searching one or more frequency positions for which the information indicates that the terrestrial network provides a synchronization block and/or avoiding searching one or more frequency positions for which the information indicates that the terrestrial network does not provide a synchronization signal block. In certain embodiments, the information indicating the frequency position may be received at the physical layer. In certain embodiments, the information indicating the frequency position may be received in an MIB transmitted by the network node. The information indicating frequency position may be formatted in a manner that causes wireless devices that do not support NTN communication to use the frequency position to search for other candidate cells, but that does not cause wireless devices that support NTN communication to search for other candidate cells (e.g., wireless devices that support NTN communication may ignore the frequency position indication because it is possible for the wireless devices that support NTN communication to select or re-select the candidate cell in the NTN). Further examples are described above, such as with respect to the heading "Physical layer related aspects."

In certain embodiments, the information received in step 1602 comprises a pointer to another cell, such as a cell in the terrestrial network. As an example, the wireless device may detect the cell indicated by the pointer and may determine whether to select or re-select that cell.

In certain embodiments, the information received in step 1602 comprises a subcarrier offset value associated with a CD-SSB for the NTN communication. The subcarrier offset value is formatted to be used when received by wireless devices that support the NTN communication and to be ignored when received by the wireless devices that do not support the NTN communication. Thus, the method of FIG. 16 (which is performed by a wireless device that does not support the NTN communication) ignores the subcarrier offset value. Further examples are described above, such as with respect to the heading "Embodiments using currently non-used values in MIB for NR NTN."

In certain embodiments, the information received in step 1602 comprises a cell barred parameter. The cell barred parameter is formatted to be used when received by the wireless devices that do not support the NTN communication (such that the wireless devices that do not support the NTN communication are barred from the candidate cell in the NTN) and to be ignored when received by wireless devices that support the NTN communication (such that the wireless devices that support the NTN communication have the option of selecting or re-selecting the candidate cell in the NTN). Thus, the wireless device performing the method of FIG. 16 uses the cell barred parameter to avoid selecting or re-selecting the candidate cell in the NTN. Further examples are described above, such as with respect to the heading "Higher layers related aspects."

In certain embodiments, the information received in step 1602 may be configured to cause the wireless to avoid cell selection or re-selection to the candidate cell prior to the wireless device acquiring whole system information associated with the candidate cell (i.e., without having to acquire whole system information associated with the candidate cell). Thus, in step 1604, the method may refrain from acquiring the whole system information associated with the candidate cell based on receiving the information to cause the wireless device to avoid cell selection or re-selection to the candidate cell. This may avoid unnecessary power consumption by the wireless device because the wireless device that does not support NTN communication can avoid consuming power that would otherwise be required to acquire full system information, camp on, or try to connect to the candidate cell in the NTN. Instead, the wireless device may select/(re)select a different, more suitable candidate cell. Similarly, certain embodiments may reduce latency because the wireless device can more quickly determine that the cell in the NTN is not suitable and may search for a suitable cell (instead of wasting time on a cell that is not suitable).

As an example, the information configured to cause wireless devices that do not support NTN communication to avoid cell selection or re-selection to the candidate cell may be received in an MIB associated with the candidate cell. Thus, in certain embodiments, the wireless device need not acquire system information after the MIB. As another example, the information configured to cause wireless devices that do not support NTN communication to avoid cell selection or re-selection to the candidate cell may be received in an MIB associated with the candidate cell, a SIB1 associated with the candidate cell, or both. Thus, in certain embodiments, the wireless device need not acquire system information after the SIB1. As another example, the information configured to cause wireless devices that do not support NTN communication to avoid cell selection or re-selection to the candidate cell may be received in an MIB associated with the candidate cell, a SIB1 associated with the candidate cell, a SIB2 associated with the candidate cell, or any combination of the preceding. Thus, in certain embodiments, the wireless device need not acquire system information after the SIB2.

In step 1606, the method avoids cell selection or re-selection to the candidate cell. Avoiding the cell selection or re-selection to the candidate cell is based on receiving, by the wireless device that does not support NTN communication, the information configured to cause wireless devices that do not support NTN communication to avoid cell selection or re-selection to the candidate cell (i.e., the information received in step 1602).

In certain embodiments, the method further comprise selecting or re-selecting a different candidate cell (not an NTN cell), as shown in step 1608. Certain embodiments further comprise establishing an RRC connection with the different candidate cell, as shown in step 1610.

Figure 17:
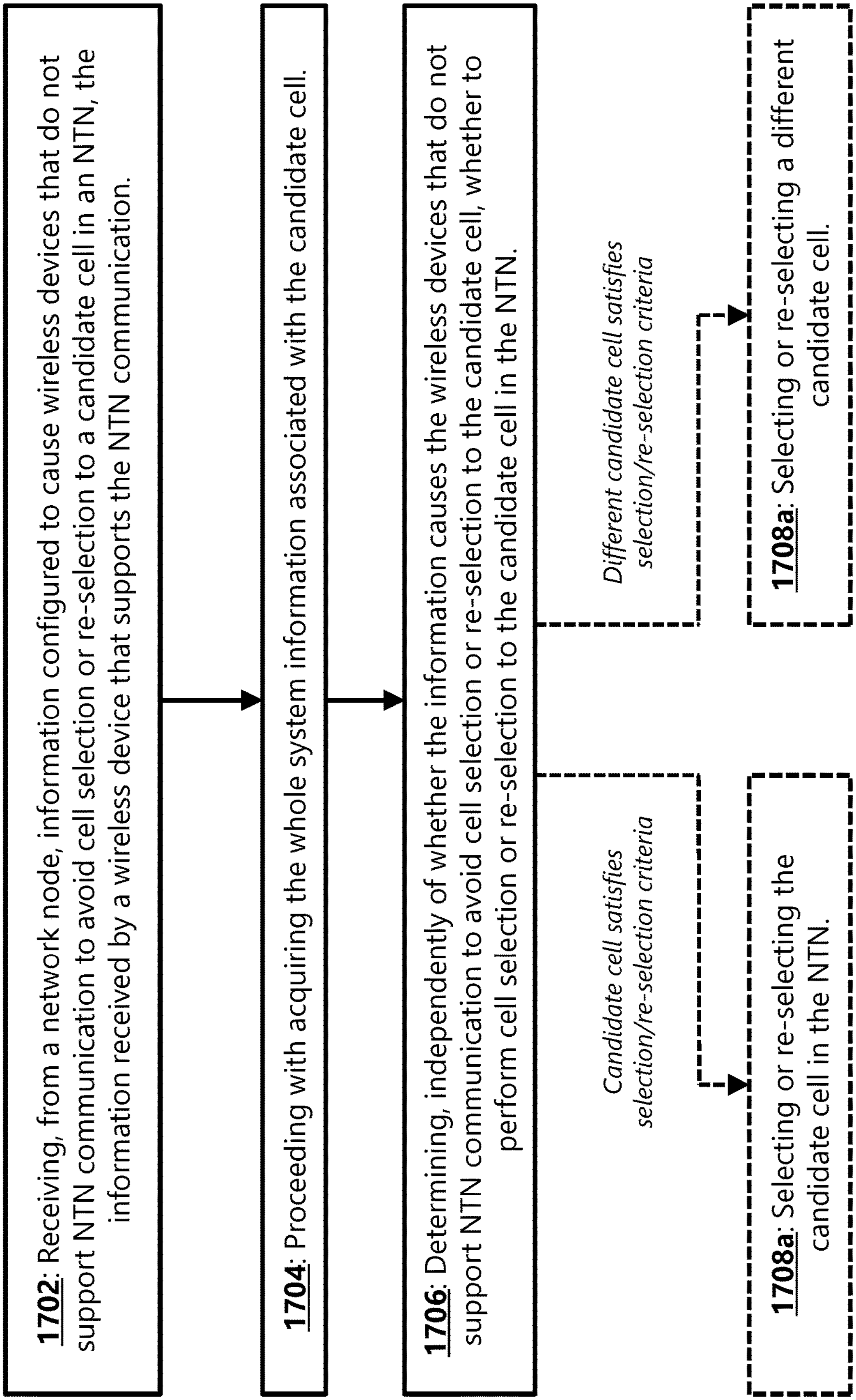
FIG. 17 illustrates an example of a method performed by a wireless device that supports NTN communication in accordance with certain embodiments.

FIG. 17 illustrates an example of a method performed by a wireless device that supports NTN communication (such as a non-legacy UE) in accordance with certain embodiments. In an embodiment, the method of FIG. 17 may be performed by a wireless device 110. For example, wireless device 110 may comprise processing circuitry 120 configured to perform the steps of the method. In an embodiment, the processing circuitry 120 may execute instructions of a computer program that cause the wireless device to perform the method.

In certain embodiments, the method begins at step 1702 with receiving information from a network node. The information is configured to cause wireless devices that do not support NTN communication to avoid cell selection or re-selection to a candidate cell in an NTN. In certain embodiments, the information may be received from a network node in an NTN, such as a BS similar to that illustrated in FIG. 1, which communicates with wireless devices via satellite. As an example, the information may be received from a network node that includes the candidate cell. The information may be received via broadcast signaling from the network node. In general, the information received in various embodiments of step 1702 may be analogous to the information received in corresponding embodiments of step 1602 of FIG. 16. However, in the method of FIG. 17, the wireless device may respond differently to receiving the information because the wireless device in FIG. 17 supports NTN communication (whereas the wireless device in FIG. 16 did not support NTN communication).

As an example, in certain embodiments, the information received in step 1702 indicates a frequency position where a terrestrial network does or does not provide a synchronization signal block. The information indicating frequency position may be provided for the benefit of the wireless devices that do not support the NTN communication and therefore may be formatted in a manner that causes wireless devices that support NTN communication to ignore the frequency position indication. The wireless device performing the method of FIG. 17 may ignore the frequency position indication. That is, the wireless device need not be required to search another frequency position because it is possible for the wireless device performing the method of FIG. 17 to select or re-select the candidate cell in the current frequency position. Further examples are described above, such as with respect to the heading "Physical layer related aspects."

In certain embodiments, the information received in step 1702 comprises a pointer to another cell, such as a cell in the terrestrial network. In certain embodiments, the wireless device performing the method of FIG. 17 may ignore the pointer, for example, while the wireless device determines whether to select or re-select the candidate cell in the NTN.

In certain embodiments, the information received in step 1702 comprises a subcarrier offset value associated with a CD-SSB for the NTN communication. The subcarrier offset value is formatted to be used when received by wireless devices that support the NTN communication and to be ignored when received by the wireless devices that do not support the NTN communication. Thus, the method of FIG. 17 (which is performed by a wireless device that supports the NTN communication) uses the subcarrier offset value. For example, the wireless device uses the carrier offset value to determine the CD-SSB to be read and then reads the CD-SSB associated with the subcarrier offset value. Further examples are described above, such as with respect to the heading "Embodiments using currently non-used values in MIB for NR NTN."

In certain embodiments, the information received in step 1702 comprises a cell barred parameter. The cell barred parameter is formatted to be used when received by the wireless devices that do not support the NTN communication (such that the wireless devices that do not support the NTN communication are barred from the candidate cell in the NTN) and to be ignored when received by wireless devices that support the NTN communication (such that the wireless devices that support the NTN communication have the option of selecting or re-selecting the candidate cell in the NTN). Thus, the wireless device performing the method of FIG. 17 ignores the cell barred parameter. Further examples are described above, such as with respect to the heading "Higher layers related aspects."

In certain embodiments, the information of step 1702 may be received by the wireless device prior to the wireless device acquiring whole system information associated with the candidate cell. As an example, the information may be received in the MIB, SIB1, and/or SIB2. Thus, depending on the embodiment, a wireless device that has acquired the MIB, the SIB1, and/or the SIB2 will have received the information configured to cause wireless devices that do not support NTN communication to avoid cell selection or re-selection to a candidate cell (prior to acquiring whole system information). After receiving the information, certain embodiments proceed with acquiring the whole system information associated with the candidate cell, as shown in step 1704. That is, because the information received in step 1702 does not cause wireless devices that support the NTN communication to avoid selection or re-selection of the candidate cell, the wireless device that supports the NTN communication and performs the method of FIG. 17 may proceed with acquiring the whole system information.

In certain embodiments, the method proceeds to step 1706 with determining whether to perform cell selection or re-selection to the candidate cell in the NTN. The determination is made independently of whether the information causes the wireless devices that do not support NTN communication to avoid cell selection or re-selection to the candidate cell. That is, the wireless device that supports NTN communication may ignore information that causes other wireless devices (e.g., legacy UEs) to avoid cell selection or re-selection to the candidate cell. The determination in step 1706 may be according to the wireless device's regular cell selection/(re)selection procedures. Certain embodiments select or re-selecting the candidate cell, for example, if the candidate cell satisfies the wireless device's cell selection/(re)selection criteria (as shown in step 1708*a*). Other embodiments select or re-select a different candidate cell, for example, if the first candidate cell fails to satisfy the wireless device's cell selection/(re)selection criteria. In certain embodiments, the wireless device may then camp on the selected/(re)selected cell and/or establish a connection (e.g., RRC connection) with the selected/(re) selected cell.

Figure 18:
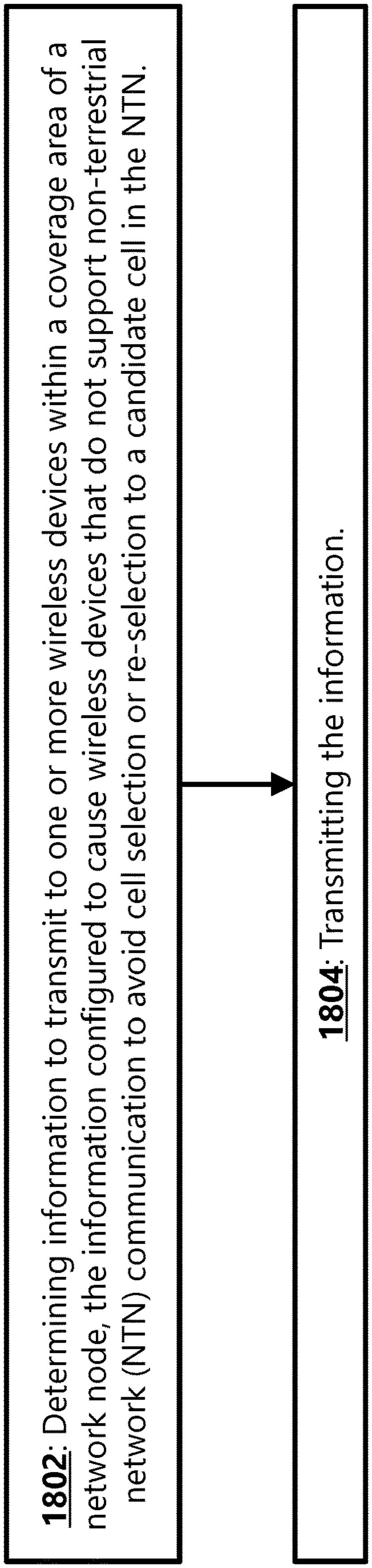
FIG. 18 illustrates an example of a method performed by a network node configured for use in an NTN in accordance with certain embodiments.

FIG. 18 illustrates an example of a method performed by a network node in accordance with certain embodiments. In an embodiment, the method of FIG. 18 may be performed by a network node 160. For example, network node 160 may comprise processing circuitry 170 configured to perform the steps of the method. In an embodiment, the processing circuitry 170 may execute instructions of a computer program that cause the network node to perform the method. In an embodiment, the network node performing the method may be in an NTN. As an example, the method may be performed by a base station similar to the BS illustrated in FIG. 1, which communicates with devices via satellite.

In certain embodiments, the method begins at step 1802 with determining information configured to cause wireless devices that do not support NTN communication to avoid cell selection or re-selection to a candidate cell in the NTN. In certain embodiments, the candidate cell is a cell of the network node performing the method of FIG. 18. Certain embodiments determine the information based on data stored in memory of the network node, based on a configuration of the network node, or in any other suitable manner. The network node may generate a transmission to be transmitted by the network node. The transmission may include the information determined in step 1802. For example, the network node may generate a transmission to be broadcast by the network node, and the transmission may comprise system information, including the information determined in step 1802 to cause wireless devices that do not support NTN communication to avoid cell selection or re-selection to a candidate cell in the NTN.

The method proceeds to step 1804 with transmitting the information to one or more wireless devices within a coverage area of the network node. As an example, the information may be transmitted via broadcast signaling. Examples of wireless devices within the coverage area of the network node may include the wireless device performing the method of FIG. 16 (such as a legacy UE that does not support NTN communication) and the wireless device performing the method of FIG. 17 (such as a non-legacy UE that supports NTN communication). Thus, the information transmitted in 1804 may be formatted in a manner that enables wireless devices that support the NTN communication to handle the information differently than the wireless devices that do not support the NTN communication. For example, the information is configured so as not to cause wireless devices that support NTN communication to avoid cell selection or re-selection to the candidate cell of the network node. Instead, the wireless devices that support NTN communication may determine whether or not to select or re-select the candidate cell based on their regular selection/(re)selection procedures/criteria.

Examples of the information that may be transmitted by the network node are provided above, for example, with respect to FIGS. 16 and 17. In certain embodiments, the information is transmitted in a portion of system information that enables the wireless devices that do not support NTN communication to avoid cell selection or re-selection to the candidate cell without having to acquire whole system information of the candidate cell. As an example, the information may be transmitted in the MIB, SIB1, and/or SIB2. Thus, depending on the embodiment, a wireless device that has acquired the MIB, the SIB1, and/or the SIB2 will have received the information configured to cause wireless devices that do not support NTN communication to avoid cell selection or re-selection to a candidate cell (without a wireless device having to acquire the whole system information if the information in the MIB, SIB1, and/or SIB2 causes that wireless device to avoid selection or re-selection to the candidate cell).

In certain embodiments, the information indicates a frequency position where a terrestrial network does or does not provide a synchronization signal block. In certain embodiments, the information comprises a pointer to another cell. In certain embodiments, the information comprises a subcarrier offset value associated with a CD-SSB for the NTN communication. The subcarrier offset value is formatted to be used when received by wireless devices that support the NTN communication and to be ignored when received by the wireless devices that do not support the NTN communication. In certain embodiments, the information comprises a cell barred parameter. The cell barred parameter is formatted to be used when received by the wireless devices that do not support the NTN communication and to be ignored when received by wireless devices that support the NTN communication.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art.

Accordingly, the above description of the embodiments does not constrain this disclosure. Other changes, substitutions, and alterations are possible without departing from the scope of this disclosure, as defined by the following claims.

The invention claimed is:

1. A method performed by a wireless device that does not support non-terrestrial network (NTN) communication, the method comprising:

receiving, from a network node, information configured to cause wireless devices that do not support NTN communication to avoid cell selection or re-selection to a candidate cell in an NTN, wherein the information comprises a subcarrier offset associated with a cell-defining synchronization block (CD-SSB) for the NTN communication, wherein a value of the subcarrier offset is used when received by wireless devices that support the NTN communication and wherein a value of the subcarrier offset is ignored when received by the wireless device not supporting the NTN; and in response to receiving the information by the wireless device not supporting the NTN, ignoring the value of the subcarrier offset and avoiding cell selection or re-selection to the candidate cell in the NTN.

2. The method of claim 1, wherein:

the information is received by the wireless device prior to the wireless device acquiring whole system information associated with the candidate cell; and in response to receiving the information, refraining from acquiring the whole system information associated with the candidate cell in the NTN.

3. The method of claim 1, wherein the information is received in a Master Information Block (MIB) associated with the candidate cell.

4. The method of claim 1, wherein the information is received in a Master Information Block (MIB) and/or a System Information Block 1 (SIB1) associated with the candidate cell.

5. The method of claim 1, wherein the information is received in a Master Information Block (MIB), a System Information Block 1 (SIB1), and/or a System Information Block 2 (SIB2) associated with the candidate cell.

6. The method of claim 1, wherein the information indicates a frequency position where a terrestrial network does or does not provide a synchronization signal block, and wherein the method further comprises detecting a candidate cell in the terrestrial network based on the frequency position.

7. The method of claim 1, wherein the information comprises a pointer to another cell.

8. The method of claim 1, wherein the information comprises a cell barred parameter, the cell barred parameter used when received by the wireless devices that do not support the NTN communication and to be ignored when received by wireless devices that support the NTN communication.

9. The method of claim 1, further comprising selecting or re-selecting a different candidate cell, wherein the different candidate cell is not an NTN cell.

10. The method of claim 9, further comprising establishing a Radio Resource Control (RRC) connection with the different candidate cell.

11. A wireless device configured such that the wireless device does not support non-terrestrial network (NTN) communication, the wireless device comprising:

power supply circuitry configured to supply power to the wireless device; and processing circuitry configured to:

receive, from a network node, information configured to cause wireless devices that do not support NTN communication to avoid cell selection or re-selection to a candidate cell in an NTN, wherein the information comprises a subcarrier offset associated with a cell-defining synchronization block (CD-SSB) for the NTN communication, wherein a value of the subcarrier offset is used when received by wireless devices that support the NTN communication and wherein a value of the subcarrier offset is ignored when received by the wireless device not supporting the NTN; and in response to receiving the information by the wireless device not supporting the NTN, ignore the value of the subcarrier offset and avoid cell selection or re-selection to the candidate cell in the NTN.

12. The wireless device of claim 11, wherein:

the information is received by the wireless device prior to the wireless device acquiring whole system information associated with the candidate cell; and in response to receiving the information, the wireless device is configured to refrain from acquiring the whole system information associated with the candidate cell.

13. The wireless device of claim 11, wherein the information indicates a frequency position where a terrestrial network does or does not provide a synchronization signal block, and wherein the wireless device is further configured to detect a candidate cell in the terrestrial network based on the frequency position.

* * * * *